INFLATABLE PROTECTIVE SUIT FOR HIGH ALTITUDE FLIGHT

Filed Oct. 20, 1953 10 Sheets-Sheet 1

INVENTOR.
CARROLL P. KRUPP
BY Dwight L. Moody
ATTY

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 3

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 4

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 5

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 6

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 7

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 8

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 9

INVENTOR.
CARROLL P. KRUPP
BY Dwight L. Moody
ATTY

Oct. 4, 1960 C. P. KRUPP 2,954,562

INFLATABLE PROTECTIVE SUIT FOR HIGH ALTITUDE FLIGHT

Filed Oct. 20, 1953 10 Sheets-Sheet 10

INVENTOR.
CARROLL P. KRUPP
BY Dwight L. Moody
ATTY 2,954,562

INFLATABLE PROTECTIVE SUIT FOR HIGH ALTITUDE FLIGHT

Carroll P. Krupp, Cuyahoga Falls, Ohio, assignor to The B. F. Goodrich Company, New York, N.Y., a corporation of New York Filed Oct. 20, 1953, Ser. No. 387,168

19 Claims. (Cl. 2—2.1)

Figure 1:
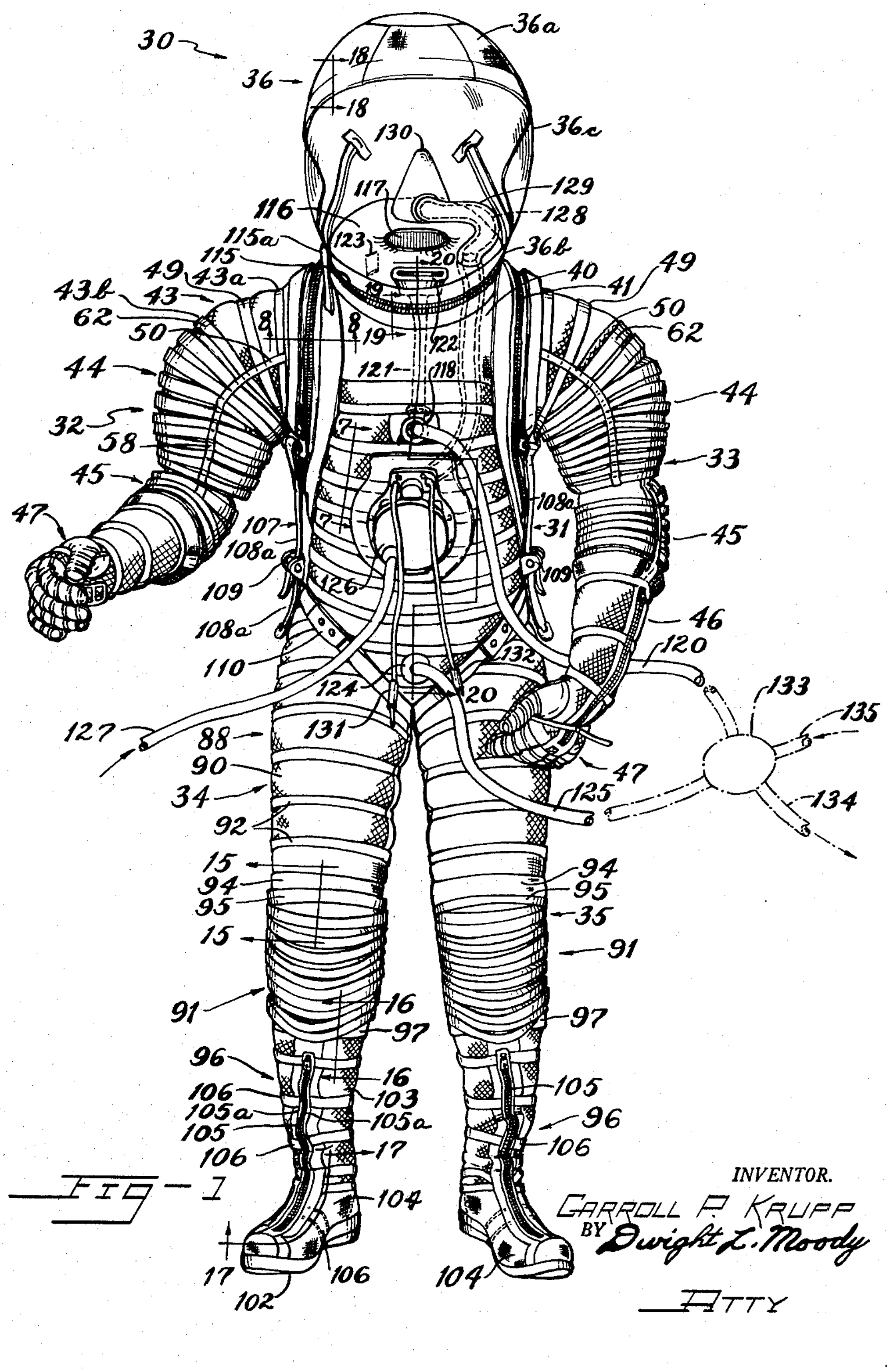

The invention relates to inflatable articles, and especially to protective suits of the inflatable type for pilots and other personnel of aircraft adapted to overcome physiological factors such as aero-embolism, and other hazards of flight at high altitudes, where the oxygen content and pressure of the atmosphere are extremely low.

Heretofore, inflatable suits having a single thickness wall of flexible impervious sheet material have generally been constructed and arranged to be worn by aviators such as pilots and other aircraft personnel, while operating in non-pressurized cockpits, cabins, or other compartments of aircraft, whereby the suits in the fully inflated condition provided a suitable, localized, artificial environment about the wearer at altitudes up to about 7 miles. Such prior suits generally were relatively loose fitting and bulky, and generally had suitable flexible joints permitting the wearer to swing and bend his arms and legs; but due to the relatively high internal pressure normally used producing resistance to bending of the flexible joints and producing inherent rigidity in loose fitting tubular portions of the suit by virtue of the resulting surface tension stressed in the flexible walls, the prior suits nevertheless offered objectionable resistance to movement of the wearer so that they caused a slowing down in the wearer's operation of the controls and other instrumentalities of the aircraft. Also, the prior suits were not designed for normal use in pressurized cockpits or cabins or other aircraft compartments, nor at high altitudes such as 12 to 20 or more miles above sea level.

An object of the invention is to provide for overcoming the foregoing and other disadvantages of the prior inflatable suits.

Other objects of the invention are to provide for locally and entirely enclosing a pilot or other person in a portable artificial environment corresponding to that existing at some desirable safe and relatively low altitude, which artificial environment is constant for any relatively higher altitude and independent of the environment inside or outside an aircraft in flight; to provide for a protective envelope of approximately body proportions and form capable of producing and maintaining such artificial environment under emergency conditions as, for example, when the pressurizing system in the aircraft fails, or when the person is ejected into space outside the aircraft in flight; to provide an improved, highly flexible, lightweight inflatable suit of good fit and reduced bulkiness and of the omni-environment full pressurized type, which suit in effect reduces the size of a pressurized cockpit or cabin to substantially the physical dimensions of the pilot or wearer so as to enable the latter to wear the suit normally as a standby or safety measure in case of failure of the aircraft pressurizing system; to provide for protecting the wearer against the hazards of high altitudes such, for example, as lack of oxygen, blood-boiling low pressure, temperature variation and ultraviolet radiation; and to provide for overcoming the natural tendency of an inflated suit i.e. under internal pressure, to become rigid or stiff and unyielding.

Further objects are to provide an inflatable suit adapted for use in an inflated condition in pressurized and/or non-pressurized compartments of aircraft and for use in outer space at high altitudes; to provide for extensive freedom and flexibility of movement of adjacent portions of the inflated suit to facilitate great mobility of movement by the wearer either in a pressurized compartment or in high altitude outer space; to provide for ease of donning and doffing the suit; to provide improved rotative and flexible joint connections for facilitating maximum freedom of movement with minimum human energy expenditure; to provide for resisting objectionable leakage while avoiding great inherent rigidity and restraining objectionable ballooning or bulging of tubular and other hollow portions of the suit; to provide for resisting lengthening of the torso and other parts of the suit under inflation thereof; to provide for ventilation of the suit and maintenance of good visibility by the wearer; to provide for improved sensitivity and flexibility of the hands and fingers of the wearer while the same are in glove portions of the suit; to provide an improved inflatable suit tailored to fit a particular size of wearer and adapted for fully protecting the entire body of the wearer against exposure to the outer atmosphere; to provide for quick placement of the head covering or helmet of the suit in a closed substantially sealed condition; and to provide for lightweight and compact, relatively close body-fitting construction and for effectiveness of operation.

These and other objects and advantages will be apparent from the following description.

Figure 2:
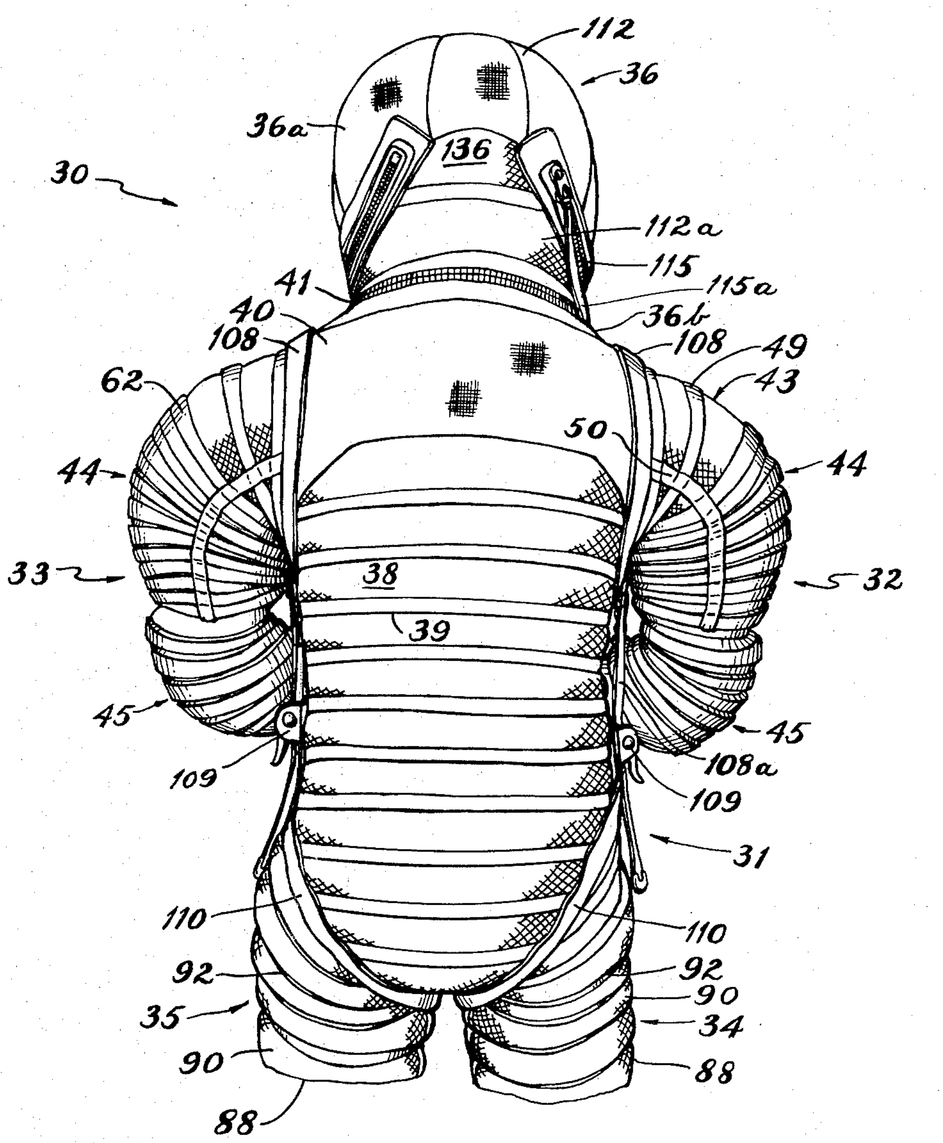
Figure 3:
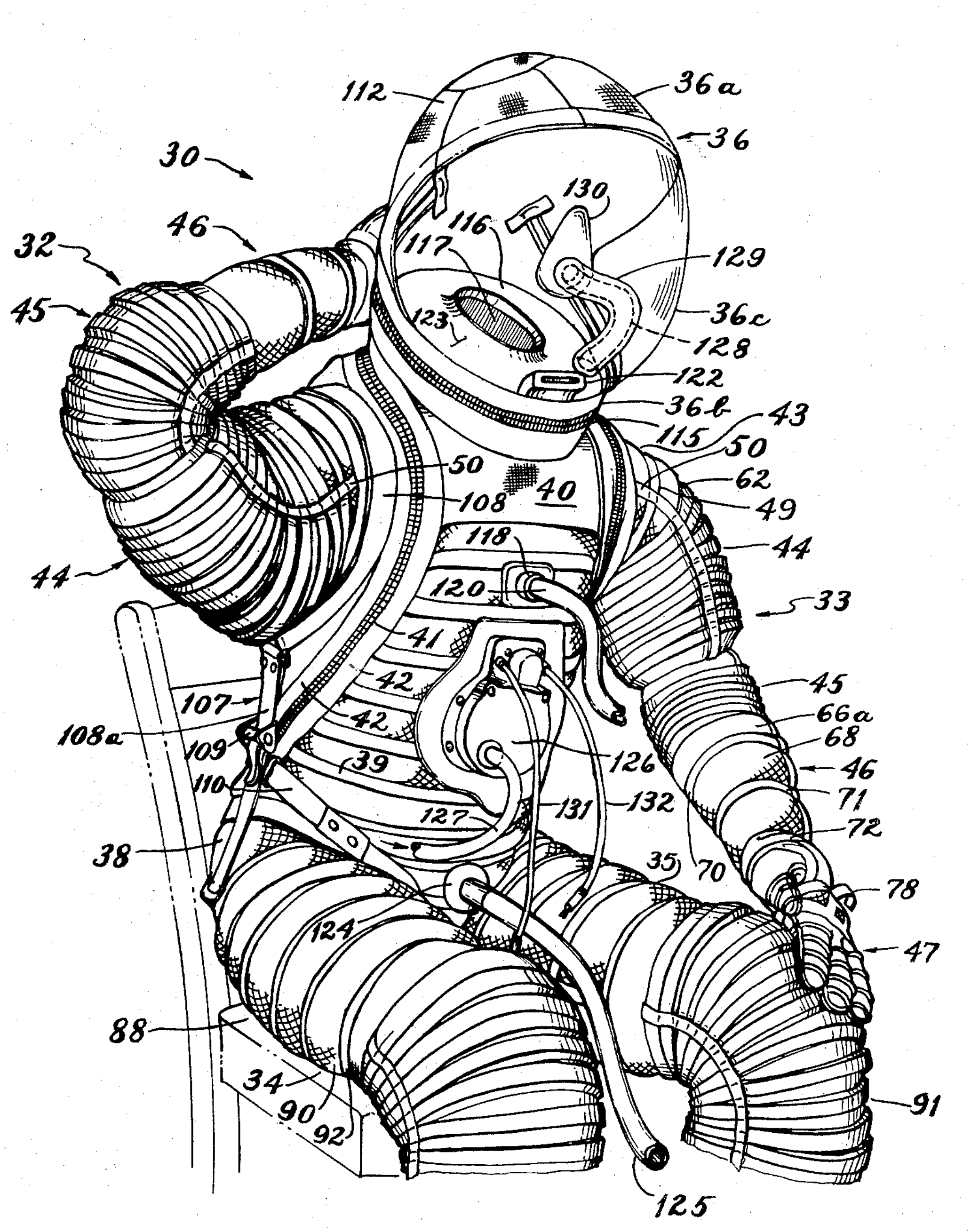
Figure 4:
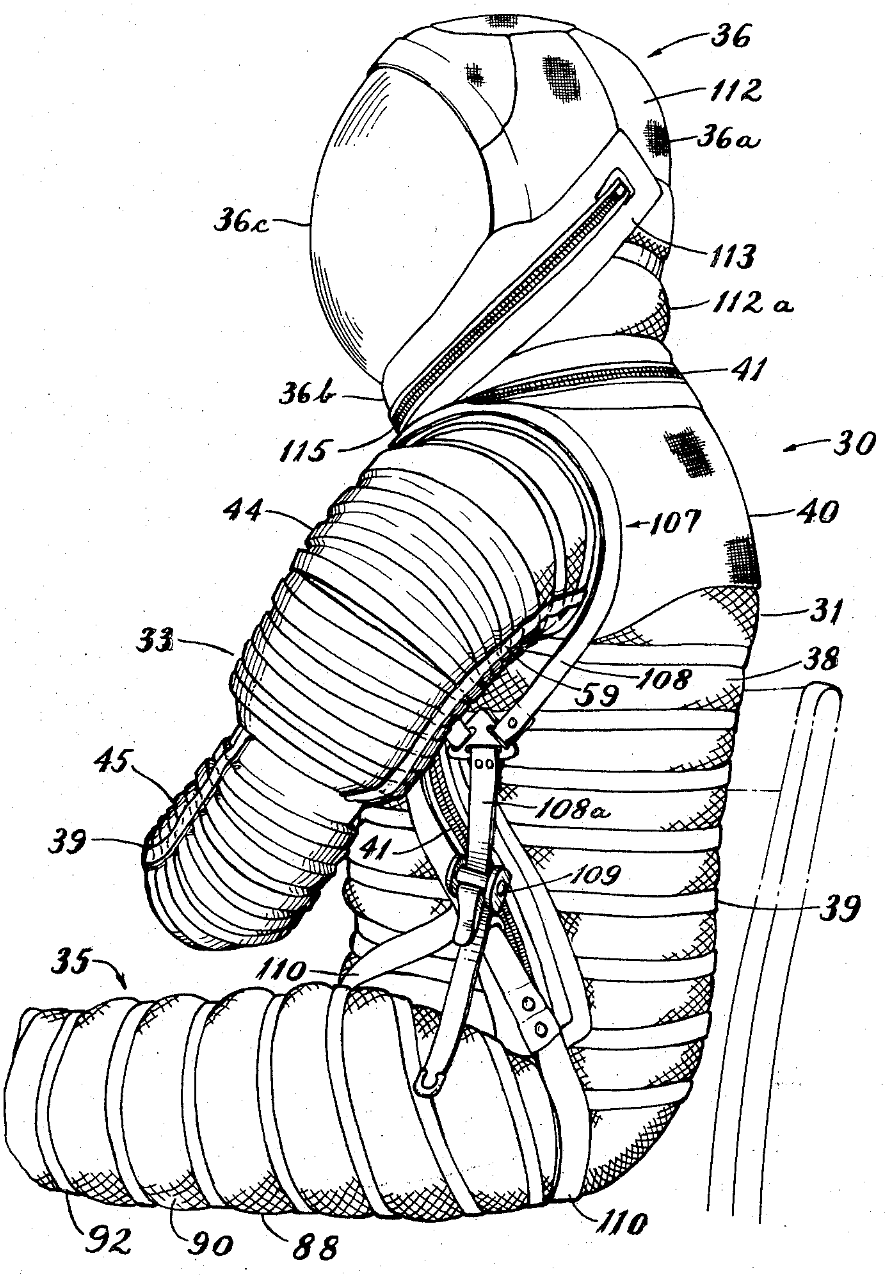
Figures 5, 6:
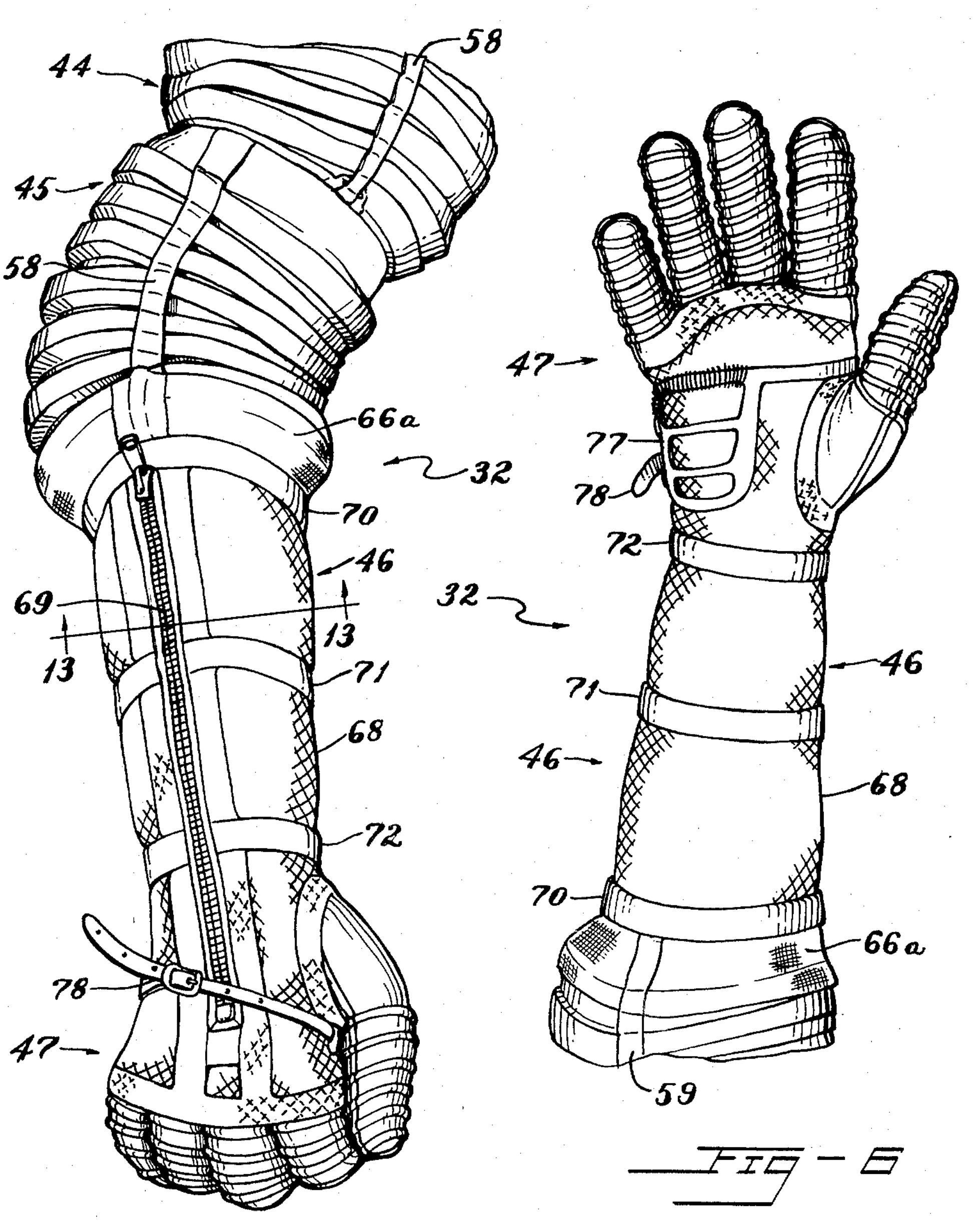
Figure 7:
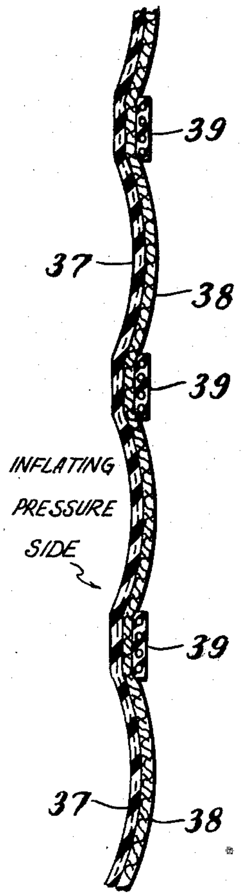
Figure 9:
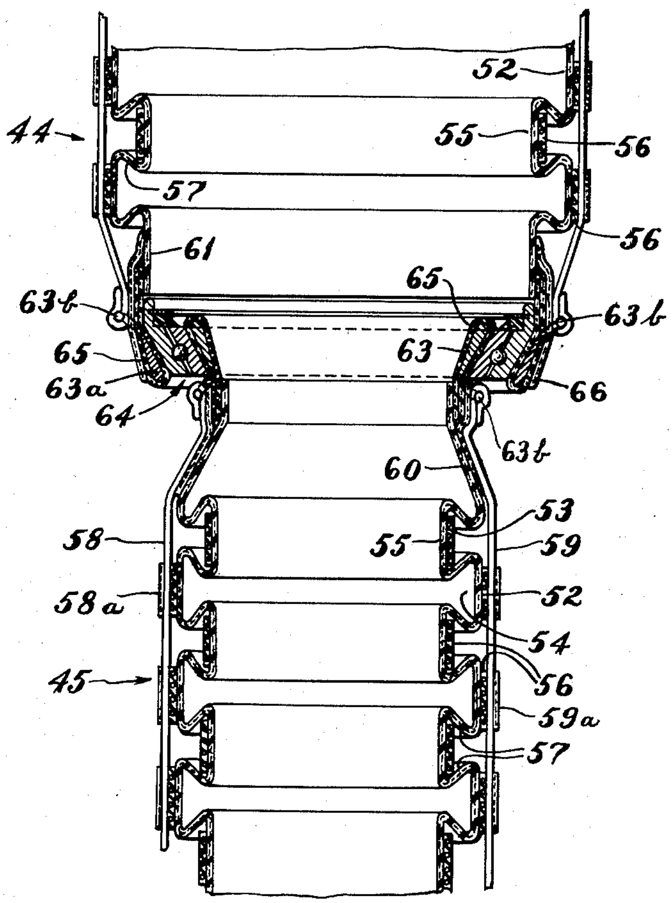
Figure 8:
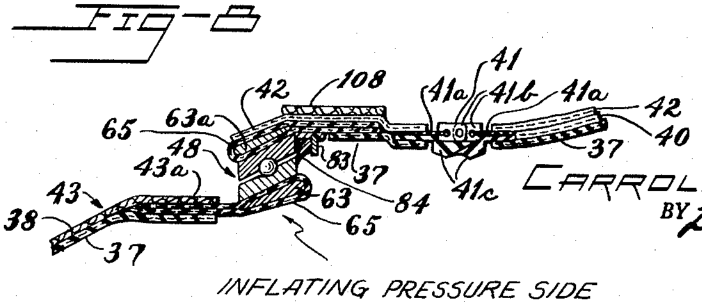
Figures 10, 11:
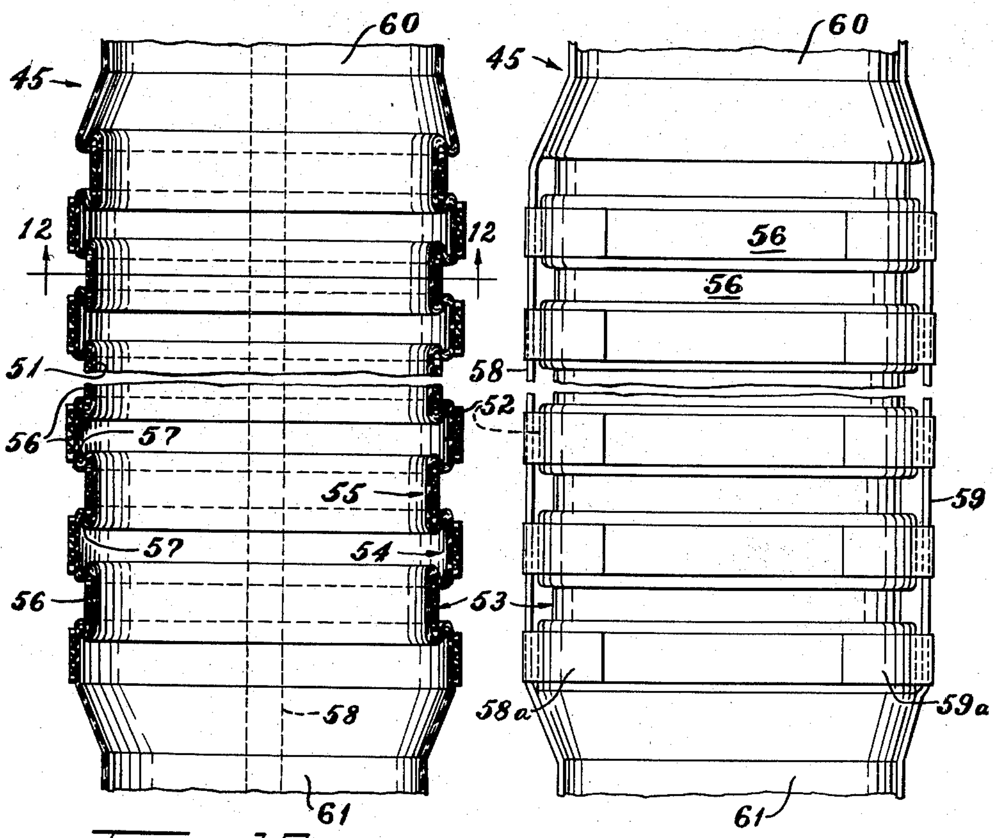

In the accompanying drawings which form a part of this specification and in which like numerals are employed to designate like parts throughout the same, Fig. 1 is a front elevational view of the improved inflatable suit adjusted for the seating position and disposed generally upright under internal inflating pressure, and constructed in accordance with and embodying the invention, Fig. 2 is a rear elevational view of the suit shown in Fig. 1, parts being broken away, Fig. 3 is a three-quarter front elevational view of the suit in the seating position mounted upon a chair, parts being broken away, Fig. 4 is a side elevational view of the suit in the seating position, parts being broken away, Fig. 5 is an elevational view of an arm portion of the suit showing the outside or back region of a forearm portion with fingers of the glove inwardly bent, parts being broken away, Fig. 6 is an elevational view showing the inside or front region of the forearm portion with the fingers straightened, parts being broken away, Fig. 7 is a sectional view in an enlarged scale taken along line 7—7 of Fig. 1 showing the flexible dual wall construction of a torso portion, parts being broken away, Fig. 8 is a sectional view in an enlarged scale taken along line 8—8 of Fig. 1 showing a rotatable connection between the shoulder part of the torso portion and an upper arm portion of the suit, parts being broken away, Fig. 9 is a longitudinal sectional view showing flexible upper arm and elbow joints and a rotatable connector therebetween, parts being broken away, Fig. 10 is a longitudinal sectional view of a flexible joint as built and before assembly with the suit, parts being broken away, Fig. 11 is a front elevational view of the flexible joint shown in Fig. 10.

Figure 12:
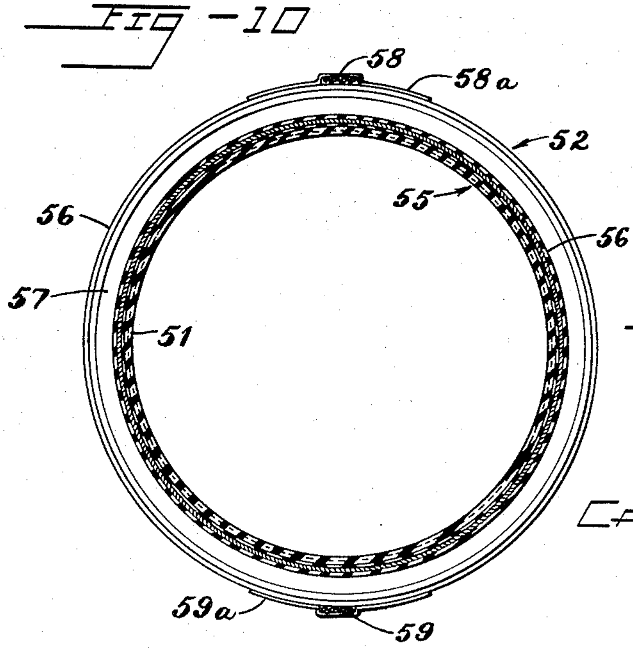
Figures 13, 14, 15, 16:
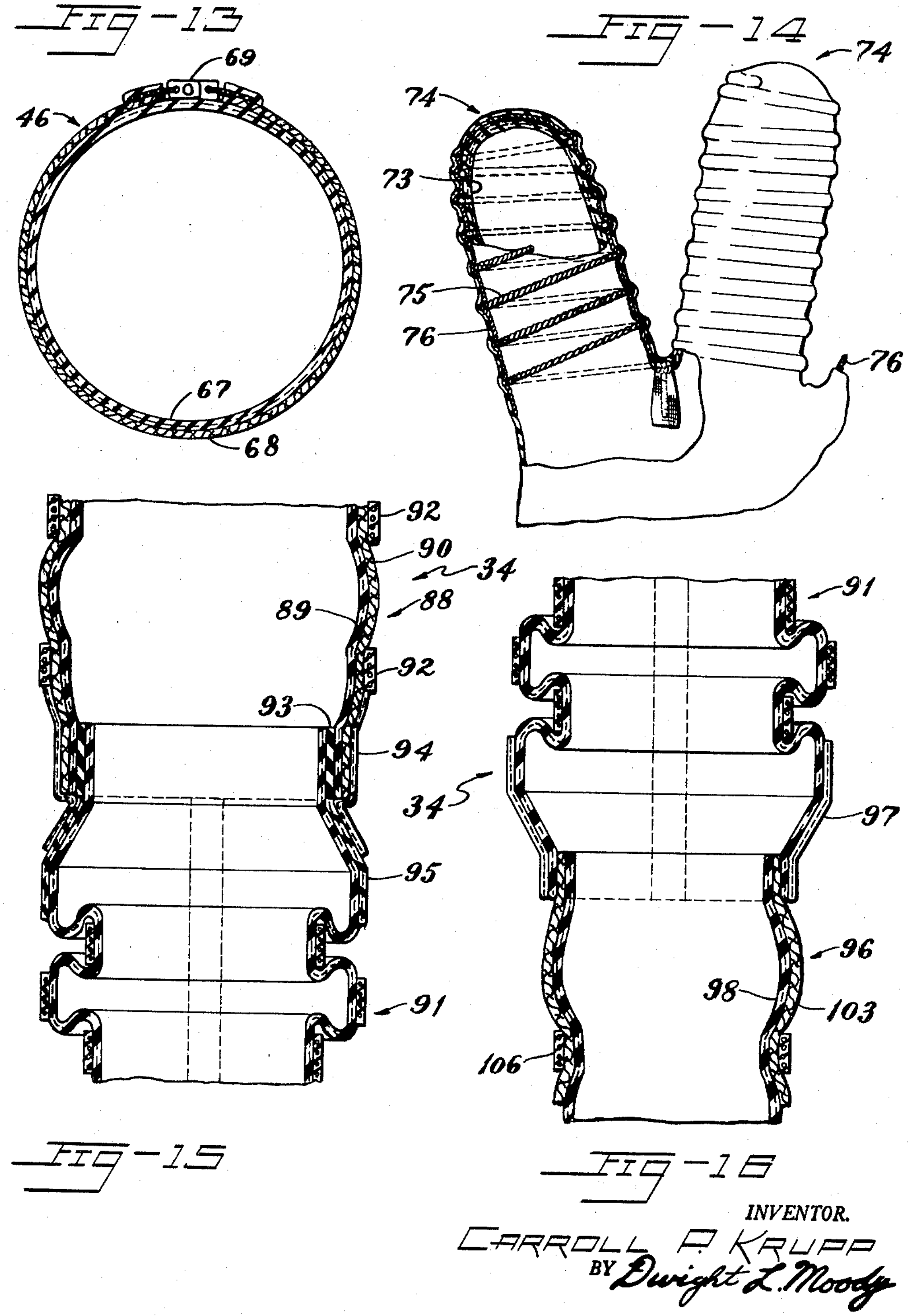
Figure 17:
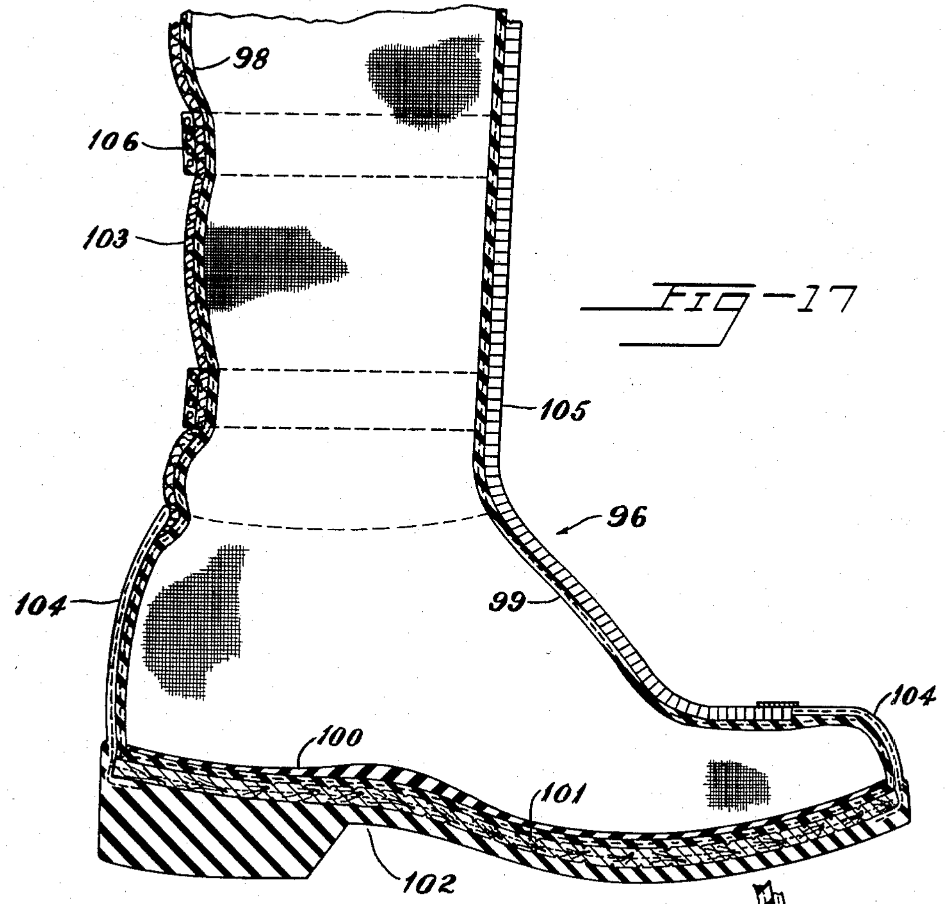
Figure 18:
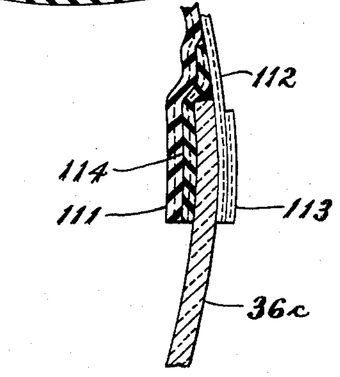
Figure 19:
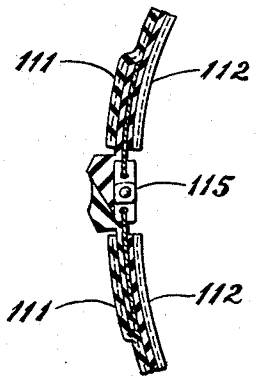
Figures 20, 21, 22, 23:
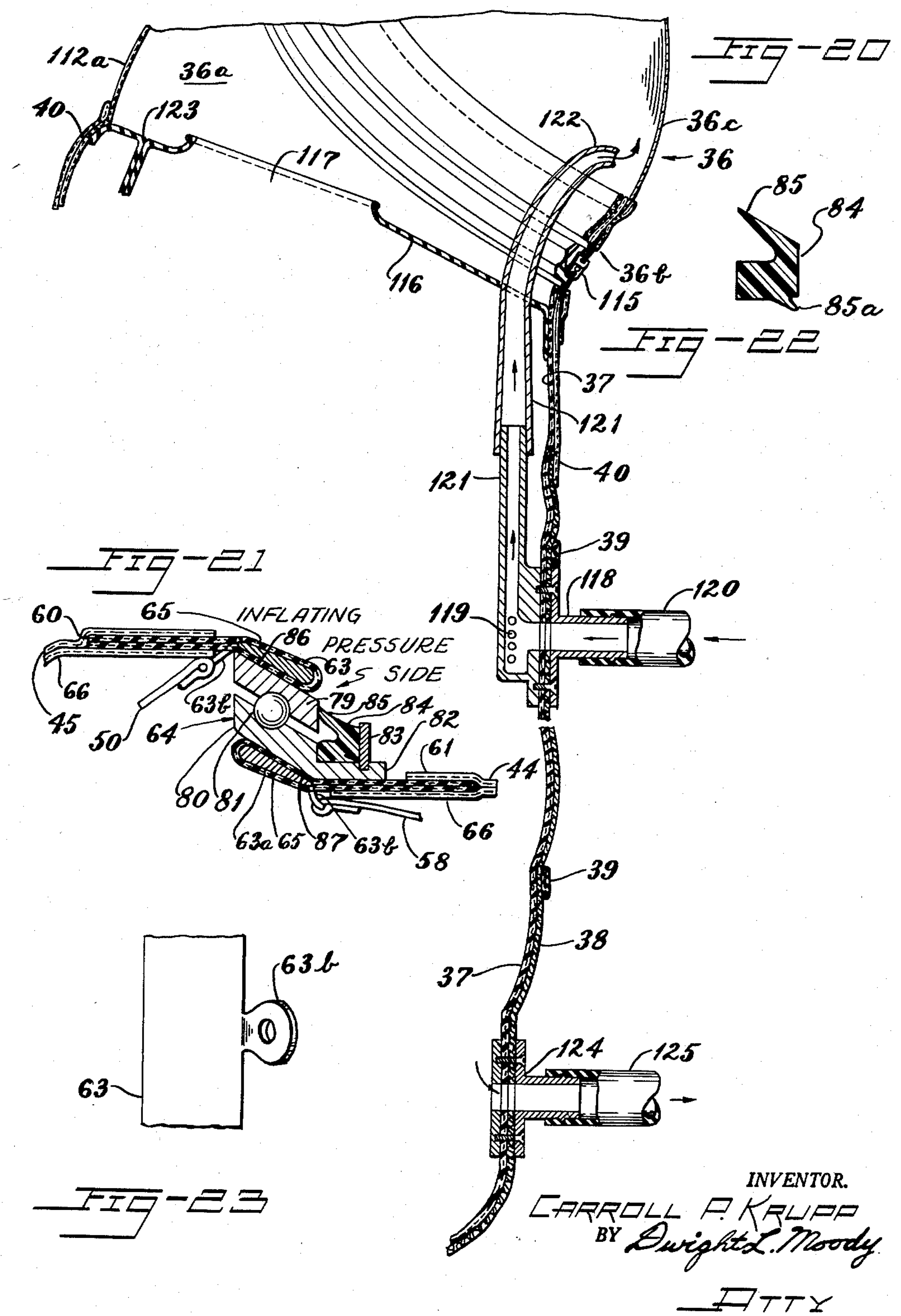

Fig. 12 is a cross-sectional view taken along line 12—12 of Fig. 10,

Fig. 13 is a cross-sectional view taken along line 13—13 of Fig. 5 showing the forearm portion of the suit, Fig. 14 is a fragmentary elevational view of the back of the right hand glove showing the index and second finger portions, parts being broken away and in section, Fig. 15 is a sectional view taken along line 15—15 of Fig. 1 showing an upper leg or thigh portion and a flexible knee joint of the suit, parts being broken away, Fig. 16 is a sectional view taken along line 16—16 of Fig. 1 showing a lower leg portion or boot portion and the flexible knee joint of the suit, parts being broken away, Fig. 17 is a sectional view taken along line 17—17 of Fig. 1 showing a boot portion of the suit, parts being broken away, Fig. 18 is a sectional view in an enlarged scale taken along line 18—18 of Fig. 1 showing a helmet portion of the suit, parts being broken away, Fig. 19 is a sectional view in an enlarged scale taken along line 19—19 of Fig. 1 showing the separable attachment of the helmet to the torso portion of the suit, Fig. 20 is a sectional view taken along line 20—20 of Fig. 1 showing the pressurizing, ventilation and helmet anti-fogging means of the suit, Fig. 21 is a sectional view in an enlarged scale of the rotatable bearing connector shown in Fig. 9, parts being broken away, Fig. 22 is a sectional view in an enlarged scale of a sealing ring before assembly in the connector shown in Fig. 21, and Fig. 23 is a fragmentary plan view of a locking ring of the aforesaid connection.

*General organization of suit*

In the illustrative embodiment of the invention shown in the drawings, an inflatable protective envelope or suit 30 of the omni-environment full pressurized type is of flexible impervious dual-walled construction and improved proportions relative to the wearer's body for good conformance therewith. It includes a torso covering or portion 31, arm coverings or portions 32, 33, leg coverings or portions 34, 35, and a head covering or portion or helmet 36 in combination with connector means for electrical communication purposes and for conducting oxygen and inflating air. The inflatable protective suit 30 incorporates improved full-circle rotatable connectors with seals at the suit's shoulders and elbows and also improved flexible joints at the elbow and knee regions in the respective arm and leg coverings permitting a wide range of tilting movement in all directions of one part of the arm or the leg covering relative to an adjacent part of the arm or the leg covering for facilitating universal swinging movement of the adjacent parts. The rotatable connectors and the flexible joints permit extensive movement by the wearer notwithstanding the stiffening of the tubular wall portions of the suit by the action thereon of an internal pressure exceeding the outer pressure in a pressurized aircraft compartment or in high altitude outer space.

The suit is tailored, that is of patterned multi-piece construction as shown in the drawings, to fit relatively close but slightly spaced from most of the body of the wearer to provide improved proportions and compactness of construction, which features are advantageous for use of the suit by a pilot, for example, of a military aircraft, wherein the operating compartment or cockpit is generally limited in size. The suit is designed to provide narrow space for passing inflating air between the suit and the limbs and torso of the wearer for body-cooling and ventilation purposes. The suit functions as a protective envelope of the omni-environment, full pressurized type for enclosing the entire body of the wearer. It makes feasible the provision of a portable, artificial environment about the wearer corresponding to that existing at some desirable low altitude such, for example, as about 8 to 12 thousand feet, which artificial environment can be maintained constant for any higher altitude and is separate from the environment inside or outside an aircraft in flight.

The construction and arrangement of the inflatable protective suit 30 provides in effect an inner garment or lining having a thin, gas-impervious and air-retaining, rubber-like coating thereon and provides an outer restraining garment or covering united with the inner lining for withstanding the inflating stresses and resisting undue distension or bulging of the inner garment or lining.

*Torso covering*

To these ends the torso covering or portion 31 may be of dual-walled construction and together with upper thigh portions 88, 88 of the leg coverings 34, 35 may be assembled upon a building form constituted by an armless torso and thighs in an angular relationship approximating the seated position of the wearer of the suit.

The torso portion has an inner wall lining 37, as shown in Figs. 7 and 22, of extensively flexible, impervious, single thickness, lightweight sheet material such, for example, as stockinette fabric coated, impregnated or otherwise treated to provide on at least one side thereof a thin continuous layer of an elastic rubber-like composition of rubber, natural or synthetic, or other rubber-like material having substantially similar chemical composition or physical properties to natural rubber and to equivalents therefor. The thin, highly flexible stockinette material of the inner lining 37 is a single thickness, lightweight, ribbed, knit fabric with little or no stretch in the direction along the ribs but stretchable crosswise of the ribs. The stockinette inner lining 37 is desirably of filamentary cotton material having a thin layer of an elastic, natural rubber composition, and is substantially impervious to the passage of air or other gas from within the suit to the outside, or to the passage of air or other gas from the outside into the suit.

The stockinette fabric in the torso portion 31 has the ribs extending longitudinally or lengthwise of the torso portion to resist objectionable longitudinal lengthening and stretching of the suit at this region, while at the same time facilitating limited lateral or circumferential distension or bulging of the inner lining under inflation of the suit for freedom of movement by the wearer.

The torso covering or portion 31 includes an outer, stress-resistant, bulge-restraining garment or covering 38 snugly fitting and suitably united with the inner lining 37 to resist the inflating stresses and objectionable outward distension of the inner lining 37 under inflation of the suit. In the inflated condition of the suit, the outer covering 38 continuously contacts the distended inner lining 37 and functions as tension-force resisting means to relieve the inflating stresses in the inner lining and may or may not be impervious to the passage of gas. Desirably, it is a single thickness, non-rubberized, knitted, open-mesh type of fabric known commercially as Tricot, which is stretchable longitudinally and laterally of the open-mesh fabric in its non-tensioned condition, but which in the tensioned condition is stretchable in one direction with little or no stretch crosswise of said one direction. The Tricot or open-mesh, knitted fabric may be made of suitable filamentary cotton, silk, rayon, nylon or other strong textile material, and is desirably formed of nylon threads. The open-mesh, knitted nylon fabric may be arranged straight-laid in the torso portion 31, whereby little or no stretching of the nylon fabric circumferentially of the torso can occur, when the fabric is in a tensioned condition longitudinally of the torso due to inflating distension of the inner lining 37. In view of this the open-mesh, knitted nylon fabric resists effectively objectionable distension and bulging of the inner lining 37.

For the particular construction shown, the outer covering 38 is adhesively secured and bonded to the inner lining 37 in relatively narrow zones extending along the margins only of the torso portion 31 at the hip region and the arm openings or shoulder region, and adjacent the neck region of the suit to promote extensive flexure and bending of the torso portion 31, while the inner lining 37 abuts against and conforms to the outer covering 38 under the influence of the internal inflating pressure within the suit.

*Torso restraining band members*

To facilitate overcoming the tendency of the tubular torso portion to become excessively rigid and stiff under internal pressure and to coact with the outer covering 38 in taking the inflating stresses and restraining the inner lining 37 against objectionable bulging, the invention provides a plurality of longitudinally spaced-apart, circumferentially-extending restraining means or band members 39, 39, as shown especially in Figs. 1 to 4 and 7. The restraining band members 39, 39 are each substantially inextensible and desirably continuous except where interrupted by an elongated entrance opening or slit and its sealing structure 41 in the torso portion 31 for donning and doffing purposes and described more fully hereinafter. The restraining band members 39, 39 may each be made of a weftless or substantially weftless cord fabric band of nylon or rayon cords superimposed upon and secured adhesively to the outside of the outer covering 38 as by a suitable rubber cement, with a suitable thin, flexible, extruded rubber strip superimposed upon the weftless cord fabric band. The rubber strip may be adhesively attached to the fabric band and to the outer covering 38 only as by a suitable liquid rubber cement.

It will be noted that the attachment of the restraining band members 39, 39 to the outer covering 38 does not, in the particular embodiment shown, include adhering the latter to the inner lining 37, which arrangement is advantageous for limited relative movement of the lining and covering to facilitate flexure of the torso portion. Moreover, in the vulcanized condition of the suit the integrally united cord fabric band and extruded rubber strip function in the manner of a hoop on a barrel to further restrain and limit the distension of the inner lining 37 at each restraining member, while facilitating limited bulging of the inner lining between adjacent restraining members. This interrupts locally and at spaced intervals the longitudinal continuity of smooth tubular configuration of the distended inner lining to make feasible flexure and bending of the inner lining despite the stiffening effect produced therein by the surface tension forces due to the internal inflating pressure.

The inner portion or lining 37 having arm and neck openings therein is disposed throughout the area of the torso portion 31, while the open-mesh nylon fabric outer covering 38 and the restraining band members 39, 39 occupy the major portion of the area of the torso portion 31, but desirably terminate at the upper front and back regions of the torso portion 31 in an outer, restraining yoke portion or covering 40 of square-woven, straight-laid, thin, flexible, non-rubberized fabric of suitable cotton material adhesively secured throughout to the inner-lining 37 and suitably united adhesively with the open-mesh, nylon fabric outer covering at its upper-front and back margins. The yoke portion 40 extends across the front and back of the suit from shoulder to shoulder and resists effectively lateral stretching of the suit between the shoulders under the internal inflating pressure.

*Torso entrance opening and closure therefor*

For donning and doffing the suit, the torso portion 31 is provided with an elongate entrance opening or continuous slit. The slit at 41 begins at one side (right side, for example) of the torso portion at the region of a hip and extends upwardly along the front of the torso portion and across a shoulder (right) and then continues around the back of the suit at the neck region and across the other shoulder (left) and then downwardly along the front of the torso portion at its other side (left) to a position adjacent the other hip, as shown especially in Figs. 1, 2 and 3. The margins of the torso portion 31 at the entrance slit are separably joined together by a suitable sealing closure such, for example, as a slide fastener structure 41 of the fabric stringer, interlocking teeth and lip-action sealing type shown and claimed in the Krupp patent 2,545,817, and having overlapping, tapered sealing elements 41*c*, 41*c* of resilient rubber at the inside of the suit. Impervious rubber-coated fabric stringers 41*a*, 41*a* mounting the teeth 41*b*, 41*b* of the slide fastener structure 41 are desirably secured as by rubber cement to the margins of the inner lining 37, the outer covering 38 and the nylon yoke portion 40 at the entrance slit, as shown especially in Figs. 1, 2, 3 and 8. For increased air-tightness and reinforcing purposes square-woven, cotton fabric reinforcements 42, 42 may be overlappingly superimposed upon and suitably attached to the fabric stringers 41*a*, 41*a* of the slide fastener structure 41.

The arrangement provides for extensive opening of the torso portion 31 and extensive flexure of the same especially at its frontal region, together with provision for forward and rearward tilting or swinging movement of the head portion or covering 36 relative to the torso portion, when the suit is uninflated and the slide fastener structure 41 is in the fully open condition. This makes feasible swinging the head portion 36 forwardly from its normal position at the upper region of the torso portion and about the neck and head of the wearer, while at the same time facilitating forward flexure of the frontal region of the torso portion 31, whereby the wearer can readily put on or take off the suit by passing his body, feet and legs first through the extensive, fully-opened entrance slit.

The inflatable protective suit has means attaching the arm coverings or portions 32 and 33 permanently and rotatably to the torso portion 31 at the opposite arm openings therein and shoulder regions thereof and spaced laterally outward from the entrance slit and slide fastener structure 41.

*Arm covering*

Each arm portion 32, 33 is of similar construction except as to the hand-receiving or glove parts thereof for accommodating the right and left hands, respectively, of the wearer; hence only the right arm portion 32, for example, will be described in detail. The arm covering or portion 32 has a relatively short, tubular upper portion 43 immediately adjacent and rotatably connected to the margin of the torso portion 31 at the arm opening therein and is formed so that under inflation, the portion 43 will have normally a 45° sideward and downward inclination relative to the torso portion for facilitating vertical sideward swinging of the arm portion 32. The portion 43 is fixedly and permanently attached to a flexible joint 44 of relatively greater length which is also normally and similarly inclined 45° in respect of the torso portion for the axially straight, inflated condition, and extends along the remainder of the upper part of the arm of the wearer to a position adjacent and above the wearer's elbow. The flexible joint 44 is permanently and rotatively attached to a second flexible joint 45 of reduced length and outside diameter accommodating the elbow of the wearer and extending partially along the upper region of the lower part or forearm of the wearer. The flexible elbow joint 45 at its lower end margin is fixedly and permanently attached to a slightly tapered, tubular lower portion or gauntlet 46 merging in and integrally united at its lower end with a hand-receiving portion or glove 47. The arm covering 33 is proportioned to fit approximately conformingly and adjacent the arm of the wearer to avoid objectionable bulkiness yet facilitate freedom of movement of the wearer's arm in all directions relative to the torso portion 31.

The rotative attachment of the upper portion 43 to the torso portion 31 includes rotatable bearing means such as an improved, annular ball bearing 48 and locking rings 63 and 63*a* shown especially in Fig. 8 and described more fully hereinafter.

*Upper arm portion*

The upper portion 43 is of dual-walled construction substantially like that of the torso portion and has desirably a suitable impervious, stockinette fabric inner lining and a suitable Tricot, nylon fabric outer covering with said lining and said covering united preferably at the upper and lower margins 43*a*, 43*b* only of the upper portion 43. The inner lining abuts against and conforms to the outer covering in the inflated condition of the suit.

The upper portion 43 has substantially midway its upper and lower margins 43*a*, 43*b*, a suitable circumferentially continuous, restraining band member 49 constructed like a band member 39 in the torso portion. Also, the upper portion 43 has united with its open-mesh, nylon fabric outer covering and the band member 49 thereon, a pair of stretch-resisting, generally flat, flexible strips 50, 50 extending longitudinally continuous along diametrically opposite paths from the upper 43*a* to the lower 43*b* margins of the portion and suitably secured to the outer covering and member 49 as by rubber cement.

Each strip 50 may be made of four tire cords of suitable textile material arranged side-by-side and enclosed entirely within and attached to an extruded rubber flexible sheath. The opposed side restraining strips 50, 50 maintain the desired axial length of the upper portion 43 under inflation of the suit, and prevent objectionable bulging along the opposed sides of the portion 43.

The upper portion 43 at its upper margin 43*a* is adhesively secured to an attaching band 65 of suitable rubberized square-woven fabric looped about the locking ring 63 engaging the bearing 48, while the cords of the restraining strips 50, 50 are tied to an apertured projection 63*b* of the locking ring 63.

*Flexible upper arm and elbow joints*

Each flexible joint 44, 45 of the arm covering 33 is of similar construction except as to the number of corrugations and overall length and diameter, and each such joint does not require an independent inner lining for retaining the inflating air; hence only the flexible joint 45 at the elbow will be described in detail. The flexible joint 45 shown especially in Figs. 9 to 12, inclusive, may be assembled upon a suitable rigid, corrugated building form and subsequently stripped therefrom, and comprises a tubular member 51 of extensively flexible, impervious, burst-resistant material such, for example, as single thickness, cotton stockinette fabric having a thin continuous coating, film or layer of suitable resilient rubber composition on one side only which coating is disposed preferably at the exterior of the member 51. The rubberized or treated stockinette material of the tubular member is formed into a series of substantially parallel, peripheral or circumferential corrugations or flutes normal to the longitudinal axis of the joint (in its straight condition) and in continuation of one another in which the ridges 52 and grooves 53 on the outside substantially correspond to the grooves 54 and ridges 55 on the inside of the member.

Each large diameter outer ridge 52 and each reduced diameter inner ridge 55 may be circular, and has a continuous annular wall substantially straight or flat in axial cross-section, and is reinforced to maintain axial flatness and to resist radial bulging and axial distortion under internal pressure.

The straight outer ridges 52, 52 are preferably of substantially uniform width axially relative to one another and the straight inner ridges 55, 55 are preferably of substantially uniform width axially relative to one another, while all the outer and inner ridges are preferably of substantially equal width axially relative to one another, which arrangement is advantageous for symmetry of pattern and uniformity of bending and also balanced tilting movement. Desirably, each outer 52 and inner 55 ridge, relatively narrow as compared to its diameter, has entirely across its axial width an annular flexible reinforcement 56 at the outside of the tubular member 51, which reinforcement 56 may be a single thickness, endless band of side-by-side rayor tire cords or of square-woven, close mesh, nylon fabric friction coated on one side with a suitable rubber composition, the band being adhesively secured to the rubberized stockinette fabric of the ridge.

For the axially straight condition of the tubular corrugated member 51 shown especially in Figs. 10 and 11, the adjacent peripheral margins of immediately adjacent outer and inner ridges are normally in radially spaced, slightly overlapping relation. Highly flexible connecting portions 57, 57 of the stockinette fabric of the member extending in continuation of and between such adjacent margins have a reversely curved, relatively compact disposition in the radial space between the overlapping peripheral margins of the ridges 52, 55 as shown in Figs. 9 and 10. All the connecting portions 57, 57, by virtue of their compact, reversely curved disposition and their relatively reduced thickness and increased flexibility as compared to the reinforced ridges 52, 55, provide for axial tilting and rolling movement i.e. progressive folding and unfolding of each connecting portion, while the stiffer ridges 52, 55 maintain their axial flatness. This makes feasible maximum freedom of bending and swinging movement, together with stabilized, extensive flexure of the flexible joint through a wide range of angularity and also relative axial and tilting movements of the outer and inner ridges 52, 55.

Bending and swinging movement of the flexible elbow joint 45 in all directions relative to the longitudinal axis of the upper arm portion 43 and flexible joint 44 is made feasible by the rotatable attachment of the flexible elbow joint 45 to the flexible upper arm joint 44; hence it is desirable to effect hinge-like bending of the joint 45 in a forward-rearward direction only, and at the same time control the relative axial and tilting movement of the ridges 52, 55 and the rolling movement of the reversely curved connecting portions 57, 57 to provide stability of flexure of the joint 45. To these ends, diametrically opposite, flexible hinge elements 58, 59 extend in straight paths continuously and axially along opposite side regions of the tubular member 51 in contacting adhered relation thereto across all the axially spaced outer ridges 52, 52 with a suitable reinforcing tape strip 58*a*, 59*a* adhered to and overlying the hinge elements at and along each outer ridge, and also span all the outer grooves 53, 53. The hinge elements are adhesively secured to the reduced diameter end marginal portions 60, 61 of the tubular member 51, as shown especially in Fig. 11. Each hinge element 58, 59 may be made of four side-by-side rayon tire cords within an extruded rubber sheath.

The flexible hinge elements are stretch-resistant and maintain effectively the desired uniform axial spacing of the outer ridges 52, 52 at the diametrically opposite side regions of the tubular member, but permit relative axial movement of the inner ridges 55, 55 and also rolling movement of the curved connecting portions 57, 57 at said side regions. Moreover, the flexible hinge elements produce little or no restraint to relative axial movement of the outer and inner ridges and the rolling movement of the curved connecting portions at zones to the sides of and laterally beyond the hinge elements, so that the ridges and connecting portions are free to move and tilt relative to one another to accommodate the desired extensive angular bending, forwardly and rearwardly, of the joint and the desired relative tilting of the opposite end portions 60, 61 of the tubular member 51. It will be noted that the normally straight hinge elements 58, 59 themselves flex and bend under forward and rearward flexure and swinging of the joint 45; thus they further facilitate maximum bending of the joint with minimum effort by the wearer.

The upper flexible joint 44 has its upper marginal end portion (corresponding to the end portion 60 of the flexible joint 45) overlapping and superimposed upon the lower margin at 43*b* of the impervious inner lining of the upper arm portion 43 and adhesively attached and sealed thereto. An endless reinforcing band 62 of suitable rubberized, square-woven, nylon fabric overlies and is adhesively bonded to the upper marginal end portion of the flexible end joint 44.

The upper flexible joint 44 has, as shown especially in Fig. 9, its lower marginal end portion (corresponding to the end portion 61 of the flexible joint 45) adhesively and sealingly attached to an overlying attaching band 65 of suitable rubberized, square-woven, nylon fabric looped about a continuous locking ring 63*a* of thin, flat steel or other stiff metal and tapered section engaging rotatable bearing means 64, desirably as an improved, annular, ball bearing of the sealing type adapted for full-circle (360°) rotative movement, while retaining the inflating pressure within the suit. An annular reinforcing strip 66 of suitable rubberized, square-woven, nylon fabric is superimposed on the band 65 in bonded relation thereto.

It will be noted that the tire cords of each hinge element of the flexible joint 44 are anchored to diametrically opposite, apertured projections 63*b*, 63*b* of the locking ring 63. The hinge elements of the flexible joint 44 are joined to and coact with the side restraining strips 50, 50 of the upper arm portion 43 to maintain the desired distance or length from the shoulder of the suit to the rotatable connection between the flexible joint 44 and the flexible elbow joint 45, and thereby maintain the flexible elbow joint 45 at the elbow of the wearer regardless of the magnitude of flexure and bending of the arm covering 33.

The upper marginal end portion 60 of the smaller diameter flexible elbow joint 45 is similarly attached through a suitable looped attaching band 65 to a suitable locking ring 63 engaging the ball bearing 64, and the tire cords of the hinge elements 58, 59 are anchored to apertured projections 63*b*, 63*b* of the latter said locking ring. The lower marginal end portion 61 of the flexible joint 45 is adhesively secured in superimposed, overlapping, fixed relation to the upper marginal portion of the gauntlet 46. The attachment has an overlying reinforcing strip 66*a* of suitable fabric.

*Gauntlet*

The lower arm portion or gauntlet 46 tapers from the flexible elbow joint toward the hand-receiving portion or glove 47 for approximate conformance and good fit with the forearm of the wearer, and merges smoothly at its lower end with the glove 47, as shown especially in Figs. 5 and 6. The gauntlet 46 has an impervious, tubular inner lining 67 of suitable stockinette fabric coated on the outside with a thin continuous layer of film of suitable rubber-like material providing a continuous annular wall for retaining the inflating pressure and abutting against and conforming to an outer covering 68 under inflation, which wall is integrally united at the lower end of the gauntlet with a suitable rubberized, stockinette fabric wall or inner lining 73 of the glove 47.

The tapered gauntlet 46 includes the outer covering 68 of suitable open-mesh nylon fabric marginally attached adhesively at the connection to the joint 45 and at the glove 47, and providing an annular wall which is divided longitudinally at the back of the gauntlet. The divide extends from a position in the gauntlet adjacent the flexible elbow joint 45 to a position beyond the wrist in the back of the glove; the outer covering 68 of the gauntlet being continued over the glove wall 73 about and along the back and palm of the glove to approximately the base of the fingers of the glove. The margins at the divide in the outer covering 68 are separably joined by a suitable non-sealing type of slide fastener 69 having the stringers of the fastener adhesively secured to said margins.

The upper margin of the outer covering 68 at its attachment to the inner lining 67 and to the flexible elbow joint 45 and adjacent the upper end of the divide, is reinforced by an endless restraining member 70 of suitable tire cord and extruded rubber strip construction. The outer covering 68 is also provided with longitudinally spaced restraining members 71, 72 of suitable tire cord and extruded rubber strip construction extending circumferentially of the gauntlet from one margin of the slide fastener 69 to the other margin of the slide fastener; one restraining member 71, for example, being located approximately midway of the length of the gauntlet, while the other restraining member 72 is disposed at the region of the wrist to facilitate localized flexure of the inner lining 67 at the wrist region.

The outer covering 68 together with its restraining members 72, 72 and slide fastener 69 in the closed condition, prevents objectionable bulging and stiffness of the tapered tubular gauntlet 46 in the inflated condition thereof and functions to sustain to a large measure the inflating stresses in the inner lining 67. The divided construction of the outer covering facilitates easy insertion of the arm and hand of the wearer through the gauntlet and into the glove in the uninflated condition of the suit when the slide fastener is in the open condition. Subsequent to such insertion, the slide fastener can be closed to draw together the margins of the outer covering at the divide, so that the outer covering 68 functions to backingly support the inner lining 67 and maintain a good fit of the gauntlet to the forearm of the wearer in the inflated condition of the arm covering 33.

*Glove*

The impervious stockinette wall 73 of the glove 47 provides back, palm, thumb and finger portions of the glove. It will be noted that portions of the open-mesh nylon outer covering 68 of the gauntlet 46 overlie and restrain bulging of both the back and the palm areas of the glove 47, as shown especially in Figs. 5 and 6.

The thumb and finger portions of the glove 47 are each constructed in like manner; hence only the construction of one of the finger portions 74 (for example, the right index finger portion) will be described in detail. As shown especially in Figs. 6 and 14, the continuous wall 73 of the index finger portion 74 is tubular and closed at its outer end for good fit and conformance to the index finger of the wearer's hand. Since a plain tube construction has inherent stiffness due to the tension stresses caused by the inflating pressure, it is desirable to interrupt locally the continuity of such stresses for facilitating extensive flexibility of the index finger portion 74.

To this end the invention provides a continuous restraining strip 75 of one or more rayon tire cords wound at a slightly reduced diameter and in a spiral manner about the tubular body of the index finger portion throughout substantially its entire length so that the tubular wall 73 has a plurality of inner and outer corrugations with deeper corrugations at the back as compared to those at the front of the finger, as shown especially in Figs. 5, 6 and 14, to facilitate inward flexure of the finger. The spiral restraining strip 75 is adhesively and continuously secured to the wall 73 and has a very thin rubber covering. For maintaining the desired length of the corrugated index finger portion, an open-looped hinge element 76 of suitable tire cord extends continuously along one side of the finger portion 74, then about the closed end, and next down along the opposite side of the finger portion 74, and is adhered to the outer corrugations, the restraining strip 75 and the inner corrugations. Desirably, a suitable thin rubber strip is adhered to and covers the hinge element 76. The construction and arrangement make feasible extensive flexibility of bending of all finger and thumb portions of the inflated glove 47, so that the wearer can readily write with a pencil, pick up small objects, and manipulate the controls and instruments of an aircraft.

A detachable guard 77 of light-weight aluminum alloy having an open grid construction is mounted upon the palm portion of the glove 47, as shown especially in Fig. 6, for facilitating bending and flexing the palm of the glove along suitable bending zones inwardly spaced from the finger and thumb portions, while further restraining objectionable bulging and stiffening of the glove 47. A leather strap and buckle arrangement 78 secured to the guard 77 removably holds the guard on the glove 47.

The arm covering 33 described hereinabove makes feasible the utmost freedom of flexing, bending and swinging movement of the wearer's arm together with full-circle relative rotative movement of adjacent parts of the arm covering 33 and extensive flexibility and freedom of bending of the fingers of the wearer's hand in the inflated condition of the suit. Objectionable elongation of the arm covering is effectively prevented. Also, the upper arm flexible joint 44 and the flexible elbow joint 45 mutually cooperate in providing greatly increased ease of bending the wearer's arm, especially at the elbow. Moreover, the normal 45 degree angular disposition of the upper arm portion 43 and the upper arm flexible joint 44 facilitates a very wide range of sidewise swinging of the arm covering 33, while permitting disposition of the arm covering 33 adjacent and downwardly along the side of the torso portion 31 in the inflated condition of the suit. Such lateral compactness is desirable for use of the suit, for example, in a relatively narrow cockpit of a fighter airplane.

*Ball bearing connector*

It will be noted that the improved ball bearings 48 and 64 provided at the shoulder and elbow connections of the arm covering for effecting 360° i.e. full-circle relative rotative movement of adjacent parts of the arm covering, are constructed and arranged substantially alike except as to specific dimensions and diameters, as shown especially in Figs. 8, 9 and 21; hence only the ball bearing 64 will be described in detail. The bearing 64, when installed in the suit, is subject to nominal radial load and a relatively great thrust load resulting from the axial separating forces effected by the inflating pressure on adjacent tubular parts of the arm covering 33. In view of this, the invention provides a pair of annular race members 79, 80 of suitable hard alloy metal such, for example, as bronze, aluminum and steel arranged concentrically with their outer peripheral surfaces acutely inclined in the same direction relative to the axis of rotation of the bearing, the acute angle of inclination being desirably within the range of approximately 10° to approximately 30° to facilitate holding the bearing in place in the suit despite opposed pulling forces or thrust exerted thereon by adjacent parts of the suit. For the embodiment shown especially in Fig. 21, the inclination is 30°.

The overlapping, inner peripheral surfaces constituting bearing faces of the race members 79, 80 may be parallel and similarly inclined as shown, although not necessarily limited thereto, and the bearing faces are each provided with an annular race groove or raceway to accommodate a single row of small diameter, spherical antifriction elements or balls 81, 81 of suitable alloy steel or a rigid plastic material such as nylon in closely spaced relation one to the other. The bearing faces including their raceways are constructed and arranged such that the balls and raceways normally contact at a predetermined angle to the plane of the bearing so that the bearing 64 is in effect a single row angular contact bearing particularly suited to withstand thrust in one direction, while facilitating free rotation.

The outer race member 80 has in continuation of its outer peripheral surface an annular extension or projection 82 of reduced thickness disposed generally perpendicular to the plane of the bearing and disposed at the side of the bearing exposed to the inflating pressure. The projection 82 has a narrow annular recess in its inner face adjacent its outer end and spaced from the pressure side face of the race member, in which recess is seated an annular retaining element 83 of suitable alloy steel.

A sealing ring 84 of flexible deformable material such, for example, as a nylon plastic material of low friction characteristics and shown especially in Fig. 22, is mounted upon the projection 82 in the space between the pressure side face of the outer race member 80 and the retaining element 83. The sealing ring has a base of rectangular section and a tapered lip portion 85 extending from the base radially inward of the outer race member 80 and inclined axially toward the pressure side face of the inner race member 79. The tapered portion yieldingly presses at its thin end against said pressure side face of the inner race member in sealing relation thereto, as shown especially in Fig. 21. The sealing ring 84 at its base has a thin, short, outwardly inclined rib 85*a* for sealing against the projection 82. Thus the ring 84 effectively closes the space between the inner 79 and the outer 80 race members, thereby preventing loss of inflating pressure through the bearing 64, and introduces only minimum frictional resistance to relative rotative movement of the race members.

The race members as shown in Fig. 21, have similarly inclined (about 30°) outer peripheral surfaces 86, 87 upon which are adhesively mounted the respective locking rings 63, 63*a* within the looped fabric attaching bands 65, 65, so that the locking rings are also inclined about 30° to resist opposed axial forces or thrust tending to pull the rings over and loose from the bearing races. The inclined construction makes feasible utilizing the axial inflating forces transmitted through the looped attaching bands 65, to draw and hold the locking rings 63, 63*a*, more tightly against the inclined race members 79, 80, and also to promote maintenance of the bearing 64 in its assembled condition, whereby unrestricted relative rotation of adjacent parts of the arm covering itself and of the arm covering and torso covering with minimum frictional resistance to rotation are permitted.

*Leg covering*

The leg coverings or portions 34, 35 of the suit are sealingly and integrally joined to the torso covering 31 at the region of the hips and along margins corresponding to the lines of natural flexure of the legs of the wearer relative to his torso. The leg coverings are tailored to extend normally in forwardly and downwardly inclined relation to the torso covering, which angular relationship is approximately equal to that assumed by the legs relative to the torso of the wearer in the seating position of the wearer's body, as shown especially in Figs. 1, 2 and 3. This arrangement avoids objectionable upward movement of the torso covering 31 relative to the wearer's body, when the wearer is seated and the suit is inflated, and also reduces objectionable frontal bulging of the lower region of the torso covering, all by virtue of eliminating looseness of fit and excess wall material of the suit at the region of juncture of the torso covering with the leg coverings.

Each leg covering 34, 35 is of similar construction except for the minor differences required to conform to the right and left legs and feet of the wearer; hence only the right leg covering 34 will be described in detail.

*Thigh portion*

The tubular leg covering 34 has an upper or thigh portion 88 of suitable dual-walled construction comprising an inner wall lining 89 of suitable rubberized, cotton stockinette fabric and an outer bulge-restraining covering 90 of suitable open-mesh, nylon knitted fabric (Tricot) united with the inner lining 89. The thigh portion 88 extends from the torso covering 31 to a suitable flexible joint 91 for covering the wearer's knee. Desirably, the inner lining 89 and outer covering 90 are adhesively secured and bonded together only at the upper and lower margins of the thigh portion for facilitating flexibility at this region of the leg covering, while the inner lining 89 abuts against and conforms to the outer covering 90 under the internal inflating pressure.

For avoiding rigidity of the inflated tubular inner lining 89 and also locally restraining bulging of the same, there is provided a plurality of longitudinally spaced-apart, circumferentially-extending restraining members 92, 92 of suitable substantially weftless cord fabric band and extruded rubber strip construction suitably adhesively attached to outer covering 90, but not to the inner lining 89. The thigh portion may, if desired, have a suitable flexible hinge element at the inner side region thereof. The arrangement facilitates limited relative movement of the lining covering, and makes feasible flexure and bending of the thigh portion 88 especially at the region of the hip.

The thigh portion at its lower margin is fixedly and adhesively secured to the upper end margin portion of a flexible knee joint 91, as shown especially in Fig. 15. The margins of the outer covering 90 and inner lining 89 overlap and are superimposed upon such end marginal portion of the joint 91 with a very thin layer 93 of suitable rubber for good bonding purposes disposed between the inner lining and the upper end marginal portion. A reinforcing band 94 of suitable square-woven, nylon fabric is arranged overlying and overlapping the margin of the outer covering 90 and also a second reinforcing fabric band 95 on the end marginal portion of the knee joint 91, all parts of the attachment being bonded together.

*Flexible knee joint*

The flexible knee joint 91 is constructed and arranged like the flexible joints 44, 45, except as to length and diameter and number of corrugations, and has desirably more outer corrugations or ridges than the flexible elbow joints. The joint 91 is proportioned to have good fit with the wearer's knee without objectionable interference to its bending, and has sufficient axial length to extend from a position adjacent and above the knee to a position adjacent and below the knee, as shown in Fig. 1.

*Boot portion*

The leg covering 34 has a lower or boot portion 96 for enclosing the wearer's leg below the knee and also the foot, which boot portion at its upper margin is fixedly and adhesively attached in overlapping underlying relation to the lower end marginal portion of the flexible knee joint 91, as shown especially in Figs. 1 and 16, with a suitable nylon fabric reinforcing band 97 overlying and adhesively attached to said lower end marginal portion of the joint. The boot portion 96 has a tubular, tapered inner wall lining 98 of suitable rubberized, cotton stockinette fabric extending from the attachment at the flexible knee joint to the region of the wearer's ankle and continuing beyond the ankle in the form of a closed shoe-shaped lining portion 99 for enclosing the wearer's foot. A suitable arch support insert 100 may be adhesively secured to the sole area of the shoe-shaped lining portion 99 at the interior thereof, while a flexible, laterally jointed, wood, innersole 101 extending throughout the sole area is secured adhesively to the portion 99 at the outside thereof with a suitable rubber sole and heel 102 adhered to the bottom of the wood innersole, as shown especially in Fig. 17.

The boot portion 96 also includes an outer covering 103 of suitable open-mesh, knitted nylon fabric extending from the attachment at the flexible knee joint 91 to the ankle and being marginally attached adhesively to the inner lining 98 at the joint 91 and to a reinforcing cover 104 of close-weave, square-woven, nylon fabric disposed snugly about the shoe-shaped lining portion 99 and adhesively secured to the wood innersole 101 and rubber sole and heel 102 and the lower part of the portion 99 of the boot portion 96. The outer covering 103 and reinforcing cover 104 have a longitudinal slit at the front of the boot portion extending continuously from a position adjacent the attachment at the knee joint 91 to a position adjacent the toe region of the boot portion, so as to facilitate the entrance of the wearer's foot and lower leg into the boot portion. A suitable non-sealing type of slide fastener 105 having fabric stringers 105*a*, 105*a* overlying and adhered to the margins of the outer covering 103 and the reinforcing cover 104 at the slit, is provided for separably joining the margins at the slit, and for maintaining good fit of the covering 103 and cover 104 to the inner lining 98 and shoe-shaped lining portion 99 in the closed condition of the fastener 105, and for holding the outer covering against the inner lining in the inflated condition of the suit.

For avoiding rigidity of the inflated inner lining 98, 99 and locally restraining bulging of the same, a plurality of longitudinally spaced-apart, circumferentially-extending, divided restraining members 106, 106 of suitable substantially weftless cord fabric and extruded rubber strip construction are provided and are adhesively attached to the outer covering 103 and cover 104 from margin to margin of the slit therein, as shown especially in Fig. 1. The arrangement facilitates flexing and limited twisting of the wearer's foot.

Inflatable suits heretofore have permitted objectionable upward movement of the head covering or helmet relative to the wearer's head, when the suit is inflated and the wearer changes from a standing position to a seated position. This has been due to limited lifting movement of the shoulder portions of the torso covering away from the wearer's shoulders and made possible by longitudinal stretching of the material of the torso covering. To the end of overcoming this difficulty, the invention provides take-up means or an adjustable harness 107, 107 at each side of the suit, extending along the torso covering 31 from the shoulder portions to the leg portions 34, 35 at the hip region for initially establishing and subsequently maintaining a determinate length between the shoulder portions and the leg portions in the seating position of the suit so as to hold the shoulder portions and in turn the head covering against lifting.

*Adjustable harness*

The adjustable harness 107 includes an upper looped tension member 108 of strong, flexible, tension-resistant material such, for example, as 1" wide, heavy duty, cotton webbing, extending in the form of a single closed loop in adhered relation about the shoulder portion of the torso covering outwardly of the slide fastener 41 and at the shoulder bearing 48, and having an extension 108*a* for engaging a suitable buckle 109 secured to a lower looped tension member 110 of suitable webbing in single closed loop form. The tension member 110 extends downwardly from the upper hip region about the junction of the leg covering with the torso covering including the crotch region of the suit, that is the path of the loop of the member 110 corresponds to the lines of flexure of the wearer's leg at its junction with the torso, as shown especially in Figs. 1, 2, 3 and 4. Each adjustable harness 107 having the extension 108*a* engaging the buckle 109 is normally adjusted by the wearer in the seated position with the suit uninflated, to establish the desired determinate length between the shoulder portion and the leg portion such that the shoulder portion is closely adjacent or against the shoulder of the wearer. When the suit is inflated, the determinate length is maintained by the harness 107 by virtue of its looped disposition about the anchorage to the leg and shoulder of the wearer. Thus, the desired height position of the shoulder portions of the torso covering and hence the head covering relative to the wearer's body, are maintained despite limited longitudinal stretching of the material of the torso covering, all without the harness introducing objectionable resistance to bending of the arm covering, for example, to a position in back of the head covering, as shown in Fig. 3.

*Head covering*

For protecting the wearer's head while permitting vision, there is provided the head covering 36 which may, if desired, be of the rigid, transparent all-plastic type attached by a separable joint structure to the torso covering, as shown and claimed in Krupp Patent 2,394,078, and having a neck sealing diaphragm or partition, as shown and claimed in Colley Patent 2,404,567. However, in the particular embodiment shown in the drawings, the head covering 36 and its attachment and neck sealing diaphragm are of different construction and arrangement than that shown in the aforesaid patents. The head covering 36 has a generally spherical upper part 36*a* merging with a reduced diameter, circular lower part or collar 36*b* fixedly and sealingly secured to the margin of the torso covering 31 at the neck opening therein. The frontal area of the spherical upper part is formed of suitable thin, transparent plastic sheet material constituting a visor 36*c* adapted for good vision purposes, while the remainder of the spherical upper part and also the collar 36*b* are of dual-walled construction and suitable flexible fabric material, as shown in Figs. 1, 2, 3, 4, 18 and 19, suitable gores and other pattern shapes of fabric being used to provide the desired spherical configuration.

The fabric spherical upper part 36*a* and the collar 36*b* have an impervious inner lining 111 of suitable rubberized, stockinette fabric and a stress-resisting outer covering 112 in part of suitable square-woven nylon fabric bonded to the stockinette, and in part, at the lower back area 112*a* of the spherical upper part 36*a*, of marginally attached suitable open-mesh, nylon fabric with a suitable lateral restraining band, as shown especially in Fig. 2, for flexing purposes. The connection of the visor 36*c* to the fabric margins of the spherical upper part and collar is shown especially in Fig. 18, wherein the visor is sandwiched between the inner lining 111 and outer covering 112 with overlying 113 and underlying 114 strip reinforcements of suitable square-woven, nylon fabric, all adhesively secured together.

For permitting lifting the spherical upper part including the visor over the wearer's head, while the suit is being worn, the inner lining 111 and outer cover 112 are divided along a path extending from a position in the spherical upper part at an upper rear side thereof slantingly downward to and then around the front region of the collar 36*b* and next slantingly upward to a corresponding position in the spherical upper part at the opposite upper rear side thereof and laterally spaced from the first said position to provide a hinging zone 136 of fabric material therebetween. A suitable lip-sealing slide fastener closure 115 is adhesively attached to the margins of the lining 111 and covering 112 at the divide for separably sealing the same, as shown especially in Fig. 19, the closure 115 having a suitable pull strap 115*a* secured to the slider of the slide fastener for convenience of manipulation by the wearer. The construction facilitates slipping the head covering on and off the wearer's head by a hinging movement at the hinging zone 113, when the suit is inflated or is uninflated and when the slide fastener is open, while permitting quickly sealing the head covering 36 to the torso covering 31 solely by closing the slide fastener 115.

*Neck sealing diaphragm*

A thin, stretchable, rubber diaphragm 116 peripherally and adhesively attached to the fabric collar 36*b* below the divide therein, separates the space within the head covering 36 from the space within the remainder of the suit. The diaphragm 116 has a central opening 117 for accommodating the wearer's neck, while the rubber margin at the opening seals against the neck, but resiliently stretches sufficiently to permit passage of the wearer's head through the opening.

The textile and rubber materials in the component parts of the suit are integrally united by vulcanization under heat.

*Inflation means*

For maintaining the suit including the head covering under a suitable internal inflating pressure for example, about one-tenth pound (0.1 lb.) above that within the pressurized cockpit of the airplane to facilitate maximum freedom of movement during normal use of the suit in the cockpit, there is provided a hollow intake fitting structure 118 sealingly secured to the front of the dual-walled torso covering 31 at the region of the wearer's chest and in communication with the interior of the dual-walled torso covering 31 through a plurality of spaced-apart discharge ports 119, as shown especially in Figs. 1 and 20, for admitting inflating air under pressure conducted by a flexible conduit 120 such, for example, as a rubber hose. An air supply tube 121 of metal extends upwardly within the suit from the intake fitting structure 118 to and through the diaphragm 116 and terminates in a relatively wide, flat nozzle 122 facing toward and spaced slightly from the plastic visor 36*c* so as to direct a jet of the inflating air against and upwardly along the visor to prevent fogging of the latter by water vapor within the closed head covering and to main the space within the head covering above the diaphragm at substantially the same pressure as that in the suit body below the diaphragm. A suitable check valve 123 mounted on the diaphragm 116 is arranged to be normally closed, but opens automatically when the inflating pressure within the head covering exceeds that below the diaphragm to permit the escape of the inflating air through the latter to the torso covering and thus equalize the pressure at both sides of the diaphragm.

A hollow exhaust fitting 124 is sealingly secured to the front of the dual-walled torso covering 31 at the region of the crotch and is in communication with the interior of the torso covering, as shown especially in Figs. 1 and 20, for exhausting the inflating air through a suitable flexible conduit 125 to the external atmosphere. The arrangement makes feasible a continuous flow of inflating air into and out of the suit and thus about the wearer's body for pressurization, ventilation, and cooling purposes.

*Oxygen supply means*

Since oxygen must be supplied to the wearer for breathing during flight at high altitudes, a suitable oxygen demand regulator valve 126 of known commercial construction is mounted sealingly on the front of the torso covering adjacent and below the intake fitting structure 118 and is connected through a suitable flexible conduit 127 to a suitable source of oxygen exteriorly of the suit, for example, the oxygen supply apparatus carried by the aircraft and/or an oxygen bottle mounted on the pilot's seat of the ejection type in the cockpit. At the interior of the suit, a pair of suitable flexible tubes 128, 129 in coaxial relation i.e. one 128 inside the other 129, are connected to the oxygen demand regulator valve 126 and extend upwardly through the diaphragm 116 for connection to a suitable breathing mask 130 used by the wearer. The oxygen flows up through the inner tube 128 to the mask 130, while the moisture-laden air exhaled by the wearer flows down through the space between the inner tube 128 and outer tube 129 and is exhausted to the interior of the suit below the diaphragm, where it mixes with the inflating air in the suit and flows out of the suit through the exhaust fitting 124 and conduit 125.

*Communication means*

Suitable electrical connector means 131, 132 are provided at the valve 126 for connection through the torso covering and through the diaphragm 116 with the microphone and earphones normally worn by the wearer of the suit for communication purposes.

*Pressure regulator means*

As shown in broken lines in Fig. 1, the inflating air intake conduit 120 and the exhaust conduit 125 are connected to a suitable pressure regulator means or valve 133 of known construction suitably carried by and located, for example, on the pilot's seat in the cockpit and functioning to maintain the desired normal 0.1 lb. differential inflating pressure in the suit, while the latter is in the pressurized cockpit, but a much greater pressure during emergency use of the suit exteriorly of the aircraft and at high altitudes. The valve 133 normally functions to exhaust at 134 the outgoing inflating air and exhaust breath of the wearer to the atmosphere, and may be normally connected at 135 to the pressurizing system of the aircraft. However, the valve 133 is arranged to close and seal automatically in an emergency such, for example, as in case of failure of the pressurizing system of the aircraft, or in case the connection at 135 is broken by reason of ejection of the seat and pilot from within the cockpit. The valve 133 also closes in case of loss of pressure within the cockpit as from bullet holes, so that the wearer is protected against the effects of high altitude by the inflated suit and can safely continue on his mission at high altitude or can safely return to his base.

The arrangement automatically maintains the interior of the suit under an inflating pressure never less than that substantially corresponding to the safe atmospheric pressure at about 35,000 feet, whether the wearer is within the cockpit, or making initially a free falling descent to about 25,000 feet and subsequently a parachute descent from high altitude such, for example, as sixty thousand feet (60,000 ft.) or more. The dual-walled construction of the suit effectively withstands burst from the inflating pressure within the suit. Thus, the suit protects effectively the wearer against the hazards of flight at high altitude, while facilitating maximum freedom of normal movements by the wearer's body and limbs. Also, the arrangement has provision for supplying oxygen to the wearer, while in the cockpit or during a parachute descent. Moreover, the suit not only protects the life of the wearer, but also makes feasible the avoidance of impairment of the wearer's judgment and calculations due to oxygen deficiency at high altitude, and the avoidance of expansion of free gases in the wearer's body due to low pressure at high altitude, which expansion of gases causes bends, choking and neurological symptoms.

Variations may be made without departing from the scope of the invention as it is defined in the following claims.

I claim:

1. In an inflatable protective suit for maintaining the wearer's entire body under an air pressure equivalent to that at a safe relatively low altitude, the combination of a torso-enclosing portion having its wall formed of normally of flexible gas-impervious sheet material united with and underlying normally flexible stress-resistant sheet material, said portion having an opening therein at the neck region thereof for accommodating the passage of the head of the wearer and said portion having in both said materials of its wall an elongate entrance slit extending upward along one side of the front of the torso-enclosing portion from a position therein adjacent a hip region thereof and extending over a shoulder region thereof and then across the back of the torso-enclosing portion adjacent the margin at said opening and back over the other shoulder region thereof and then downwardly along the other side of the front of the torso-enclosing portion to a corresponding position therein adjacent the other hip region thereof, and separable sealing closure means united with the margins of said wall at said slit therein for admitting the wearer's body when said closure means is open.

2. An inflatable protective suit for maintaining the wearer's entire body under an air pressure equivalent to that at a safe relatively low altitude, while facilitating free flexible movement of the wearer's limbs, said protective suit comprising a body-enclosing outer covering of flexible stress-resistant material and a body-enclosing inner lining of flexible gas-impervious material united with said outer covering to form therewith torso, arm and leg-enclosing portions of the suit having said inner lining, in the inflated condition, against and conforming to said outer covering, a head-enclosing portion joined to the torso-enclosing portion at the neck region thereof, and an adjustable harness extending longitudinally along each side of said torso-enclosing portion and comprising at said each side a flexible tension element of substantially inextensible material extending longitudinally in a single closed loop about the torso-enclosing portion at its shoulder region and secured thereto, a second flexible tension element of substantially inextensible material extending in a single closed loop about a leg-enclosing portion of the suit at its junction with said torso-enclosing portion, and means for adjustably and separably joining said tension elements one to the other so as to maintain a determinate length of the torso-enclosing portion in the seating position of the suit for resisting extension of said torso-enclosing portion and preventing lifting of said head-enclosing portion relative to the wearer's head in the inflated condition of the suit.

3. An inflatable protective suit for incasing the wearer's body in an air-pressurized environment during high altitude flight, said protective suit comprising a torso-enclosing portion of flexible gas-impervious wall material and a leg-enclosing portion joined to said torso-enclosing portion, said leg-enclosing portion comprising an outer covering of flexible stress-resistant textile fabric material and an inner lining of flexible gas-impervious textile fabric material abutting thereagainst and united therewith to form said leg-enclosing portion including a boot with a calf-enclosing portion and a foot-receiving part, said calf-enclosing portion extending from a position adjacent and below the knee region of said leg-enclosing portion and merging integrally with said foot-receiving part, said calf-enclosing portion and said foot-receiving part having in their outer covering only an elongate slit extending along the front of the boot to a position in the upper front region of the foot-receiving part, separable closing means mounted on the margins of said outer covering at said slit for facilitating the admittance and withdrawal of the wearer's leg and foot, and spaced flexible restraining band members of substantially inextensible material on said calf-enclosing portion extending circumferentially thereabout and mounted on said outer covering thereof to restrain locally outward distension of said inner lining thereof in the inflated condition of the suit.

4. An inflatable high-altitude protective suit for maintaining the wearer's body under an air pressure greater than the surrounding air pressure, while providing for free flexible movement of a limb of the wearer, said protective suit comprising a torso-enclosing portion of normally flexible gas-impervious material and a limb-enclosing portion connected thereto having intermediate its length a flexible corrugated joint interconnecting adjacent parts of the limb-enclosing portion for facilitating relative swinging movement of said parts forwardly and rearwardly, said limb-enclosing portion comprising an outer covering of flexible stress-resistant textile fabric material and an inner lining of flexible gas-impervious textile fabric material united with the outer covering to form said adjacent parts having said inner lining thereof, in the inflated condition, abutting against and conforming to said outer covering thereof, said flexible corrugated joint comprising a tubular member of extensively flexible gas-impervious textile fabric material arranged in the form of substantially parallel circumferential corrugations in continuation of one another providing annular ridges and grooves in said member with reversely curved connecting portions of said extensively flexible fabric material constituting the sides of said grooves for facilitating axial rolling movement of said connecting portions, the annular wall of each said ridge being substantially flat in axial cross-section, and means comprising circumferentially stretch-resisting textile material circumferentially overlying each of said ridges and secured to said member for maintaining the axial flatness and resisting radial distortion of the ridges in the inflated condition of the suit, and a pair of flexible stretch-resistant hinge elements extending axially along diametrically opposite sides of said tubular member from end to end thereof and spanning said grooves and extending across in overlying relation to each ridge and connected to end portions of said member for resisting axial separating movement of said ridges and said end portions at said hinge elements, while permitting relative axial movement of the said ridges and the axial rolling movement of the reversely curved connecting portions at zones thereof laterally outward of said hinge elements for facilitating extensive flexure and bending of said joint forwardly and rearwardly and extensive relative tilting of said end portions of said tubular member and of said adjacent parts of said limb-enclosing portion.

5. An inflatable high-altitude protective suit for maintaining the wearer's body under an air pressure greater than the surrounding air pressure, while providing for free flexible movement of an arm of the wearer, said protective suit comprising a torso-enclosing portion of normally flexible gas-impervious material, an arm-enclosing portion having at its elbow region a flexible corrugated joint and having a second flexible corrugated joint at its upper arm region adjacent the first said flexible corrugated joint, both flexible corrugated joints constituting a flexible joint structure interconnecting adjacent parts of the arm-enclosing portion for facilitating relative swinging movement of said parts forwardly and rearwardly, an annular rotatable connector joining the torso-enclosing portion and the arm-enclosing portion and providing full-circle relative rotative movement between said portions, and a second annular rotatable connector joining the first said flexible corrugated joint to the second said flexible corrugated joint and providing full-circle relative rotative movement between said joints, said arm-enclosing portion comprising an outer covering of flexible stress-resistant textile fabric material and an inner lining of flexible gas-impervious textile fabric material united with the outer covering to form said adjacent parts having said inner lining thereof, in the inflated condition, abutting against and conforming to said outer covering thereof, each flexible corrugated joint comprising a tubular member of extensively flexible gas-impervious textile fabric material arranged in the form of substantially parallel circumferential corrugations in continuation of one another providing annular ridges and grooves in said member with reversely curved connecting portions of said extensively flexible fabric material constituting the sides of said grooves for facilitating axial rolling movement of said connecting portions, the annular wall of each said ridge being substantially flat in axial cross-section, an annular reinforcement of circumferentially stretch-resisting textile material circumferentially overlying each of said ridges for maintaining the axial flatness and resisting radial distortion of the ridge in the inflated condition of the suit, and a pair of flexible stretch-resistant hinge elements of textile material extending axially along diametrically opposite sides of said tubular member from end to end thereof and spanning said grooves and secured in overlying relation to each ridge and to end portions of said member for resisting axial separating movement of said ridges and said end portions at said hinge elements, while permitting relative axial movement of the ridges and the axial rolling movement of the reversely curved connecting portions at zones thereof laterally outward of said hinge elements for facilitating extensive flexure and bending of said joint forwardly and rearwardly and extensive relative tilting of said end portions of said tubular member and of said adjacent parts of said arm-enclosing portion.

6. An inflatable high-altitude protective suit as defined in claim 5 in which said arm-enclosing portion at its upper arm region intermediate the first said annular rotatable connector and said second flexible corrugated joint extends, in the inflated condition, in angularly downward and outward relation to the adjacent side of said torso-enclosing portion for facilitating sidewise swinging movement of said arm-enclosing portion.

7. An inflatable high-altitude protective suit as defined in claim 5 in which said arm-enclosing portion has at its upper arm region intermediate the first said annular rotatable connector and said second flexible corrugated joint, a circumferentially-extending restraining band member of flexible circumferentially stretch-resistant textile material overlying and secured to the outer covering of said arm-enclosing portion at said upper arm region and spaced from said rotatable connector and from said second flexible corrugated joint, and a pair of flexible stretch-resistant restraining elements of textile material extending along diametrically opposite sides of the outer covering in continuation of the pair of flexible stretch-resistant hinge elements of said second flexible corrugated joint and secured thereto so as to coact with the latter said hinge elements in maintaining the first said flexible corrugated joint at the elbow of the wearer's arm.

8. An inflatable protective suit for incasing the wearer's body in an air-pressurized environment during high altitude flight, said protective suit comprising a torso-enclosing portion of flexible gas-impervious wall material having a continuous annular collar divided circumferentially and extending about a neck opening in the torso portion, a head-enclosing portion including flexible impervious material connected to said collar, and a separable slide fastener including sealing elements therefor extending entirely about the front region of said collar and terminating in spaced ends at the upper back region of said head-enclosing portion to provide a hinging zone of the last said material at the back region between said ends, said slide fastener being secured to the margins at the divide in said collar for separably and sealingly closing said margins and also for facilitating swinging the helmet from in front of the wearer's face to a position at the back and free of the wearer's head by virtue of hinging movement at said hinging zone when said slide fastener is in the open condition.

9. An inflatable protective suit for incasing the wearer's body in an air-pressurized environment during high altitude flight, said protective suit comprising torso, arm and leg-enclosing portions of normally flexible air-tight material and a head-enclosing portion connected to the torso enclosing portion at the neck opening region thereof, a centrally apertured diaphragm of thin resilient rubber-like material in the neck opening of and secured to said torso-enclosing portion to separate the space within the latter portion from that within said head-enclosing portion, an inflating air inlet structure for connection to a source of inflating air and mounted on the front of said torso-enclosing portion at the chest region thereof in communication with said space therein, conduit means connected to the air inlet structure and extending upwardly within the torso-enclosing portion and through said diaphragm in communication with the space within said head-enclosing portion, means in said diaphragm spaced from said neck opening for exhausting air within the space in the head-enclosing portion through the diaphragm and into the space in the torso-enclosing portion, and an inflating air exhaust fitting of tubular form mounted on the front of said torso-enclosing portion spaced from said inlet structure and at the lower abdominal region of the latter portion for connection to exhaust valve control means and for facilitating the circulation of the inflating air from said inlet structure throughout said torso, arm and leg-enclosing portions of the suit to cool the wearer's body.

10. An inflatable high-altitude flying suit capable of maintaining the wearer's entire body under an air pressure equivalent to that at a safe relatively low altitude, while providing for free flexible movement of the wearer's limbs, said flying suit comprising a body-enclosing outer covering of flexible fabric material stretch-resistant laterally but slightly stretchable longitudinally of the suit and a body-enclosing inner lining of flexible knitted fabric material stretchable laterally but stretch-resistant longitudinally of the suit and including a thin air-impervious layer of resilient rubber-like material on the outer surface of said lining, said outer covering and said inner lining being united to form torso, arm and leg-enclosing portions of the suit having said inner lining, in the inflated condition, abutting against and conforming to said outer covering, a helmet connected to the torso-enclosing portion, a flexible yoke textile fabric across the upper front and back regions of said torso-enclosing portion and overlying said lining to resist lateral stretch, flexible restraining band members of circumferentially stretch-resistant material spaced-apart longitudinally thereof and extending circumferentially thereabout on the outer covering thereof, said torso-enclosing portion including an elongate entrance slit and slide fastener sealing means therefor extending continuously from a position in one hip region of the torso-enclosing portion upward along the front and one side thereof and across a shoulder region thereof to and across the back thereof adjacent the helmet and then extending across the other shoulder region thereof and downwardly along the front and other side of the torso-enclosing portion to a corresponding position in the other hip region thereof for admitting the wearer's body, a thin centrally apertured diaphragm of resilient rubber-like material connected to said torso-enclosing portion at the neck region thereof, an inflating air-intake structure mounted on said torso-enclosing portion at the chest region thereof in communication with the space within such portion and including a conduit extending through said diaphragm in communication with the space within the helmet for admitting inflating air thereto, means in said diaphragm spaced from the aperture therein for exhausting air from the space in the helmet to the space in the torso-enclosing portion, an inflating air exhaust fitting of tubular form mounted on said torso-enclosing portion spaced from said inlet structure and at the lower abdominal region of such portion, an annular rotatable connector joining each arm-enclosing portion to said torso-enclosing portion and providing full-circle relative rotative movement therebetween, each arm-enclosing portion including a flexible corrugated joint at the elbow region thereof, a second flexible corrugated joint at the upper arm region thereof, and an annular rotatable connector joining said joints and providing full-circle relative rotative movement therebetween, each arm-enclosing portion having a tapered gauntlet connected to the flexible elbow joint and terminating in a glove including flexible corrugated fingers, said gauntlet comprising said outer covering and said inner lining and including longitudinally spaced-apart circumferentially-extending restraining band members of flexible stretch-resistant material mounted on said outer covering which has a longitudinal divide and slide fastener closing means therefor extending along the back of the gauntlet to at least the wrist region thereof, each leg-enclosing portion including a flexible corrugated joint at the knee region thereof, a thigh portion fixedly attached to said torso-enclosing portion and to the last said flexible corrugated joint and including circumferential flexible restraining band members, and a boot fixedly attached to the last said flexible corrugated joint, said boot including a calf-receiving portion and a foot-receiving portion each comprising said outer covering and said inner lining, said boot including in its outer covering a longitudinal divide and slide fastener closure means therefor extending along the front region of said calf-receiving portion to a position in the upper region of said foot-receiving portion, and adjustable harness means extending along each side of said torso-enclosing portion and secured thereto at the shoulder region thereof and to a leg-enclosing portion at the junction of its thigh portion with said torso-enclosing portion to maintain a determinate length of the latter portion in the seating position of the suit in its inflated condition for resisting extension of said torso-enclosing portion and lifting of said helmet relative to the wearer's head.

11. A flexible corrugated joint for connecting adjacent parts of a limb-enclosing portion of an inflatable protective suit for maintaining the wearer under air pressure equivalent to that at a safe relatively low altitude, while providing for relative swinging movement of said parts forwardly and rearwardly, said joint comprising a tubular member of extensively flexible gas-impervious material comprising single thickness textile fabric material having a thin layer of resilient rubber-like material thereon, said tubular member being arranged in the form of substantially parallel circumferential corrugations in continuation of one another providing annular ridges and grooves in said member with reversely curved connecting portions of said extensively flexible material constituting the sides of said grooves for facilitating relative axial movement of the ridges, an annular reinforcement of single thickness stretch-resistant textile material secured to the annular wall of each ridge for maintaining the said ridges axially flat and for resisting radial distortion of the ridges in the inflated condition of the suit, and a pair of hinge elements of flexible stretch-resistant textile material extending axially along diametrically opposite sides of said tubular member from end to end thereof and spanning said grooves and extending across in overlying relation to each ridge and secured to end portions of said member for resisting axial separating movement of said ridges and said end portions at said hinge elements, while permitting relative axial movement of the said ridges by virtue of flexure of said reversely curved connecting portions at zones laterally outward of said hinge elements for facilitating extensive flexure and bending of said joint forwardly and rearwardly and extensive relative tilting of said end portions of said tubular member and of said adjacent parts of the limb-enclosing portion of the suit.

12. A flexible corrugated joint for connecting adjacent parts of a limb-enclosing portion of an inflatable protective suit for maintaining the wearer under air pressure equivalent to that at a safe relatively low altitude, while providing for relative swinging movement of said parts forwardly and rearwardly, said joint comprising a tubular member of extensively flexible gas-impervious single thickness knitted textile fabric material arranged in the form of substantially parallel circumferential corrugations in continuation of one another providing circular outer ridges and grooves and substantially corresponding circular inner ridges and grooves in said member with connecting portions of said extensively flexible fabric material constituting the sides of said grooves extending in a reversely curved disposition in the radial space between adjacent margins of immediately adjacent outer and inner ridges for facilitating axial rolling movement of said connecting portions, the annular wall of each outer and inner ridge being of uniform width and relatively narrow as compared to its diameter and being substantially flat in axial cross-section, an annular flexible reinforcement of textile material secured to the annular wall of each of said ridges, for maintaining the ridge axially flat and for resisting radial distortion of the ridge in the inflated condition of the suit, and a pair of flexible stretch-resistant hinge elements of textile material extending axially along diametrically opposite sides of said tubular member from end to end thereof and spanning said outer grooves and adhesively secured in overlying relation to and across each outer ridge only and to reduced diameter end portions of said member for resisting axial separating movement of said outer ridges and said end portions at said hinge elements, while permitting a relative axial movement of the outer and inner ridges and the axial rolling movement of the reversely curved connecting portions at zones laterally outward of said hinge elements for facilitating extensive and substantially uniform flexure and bending of said joint forwardly and rearwardly and balanced tilting movement of said end portions of the member and of said adjacent parts of the limb-enclosing portion of the suit.

13. An annular rotatable connector joining adjacent parts of an inflatable high-altitude protective suit, while providing for relative rotating movement of said parts and for resisting relative axial separating movement thereof in the inflated condition of the suit, said rotatable connector comprising annular outer and inner race members in concentric radially spaced relation each having axially spaced-apart side faces and an outer and an inner surface therebetween extending circumferentially about the race member, the outer surfaces of said race members being unidirectionally and acutely inclined relative to the axis of rotation of the connector and engaging in overlapping relation adjacent parts of an inflatable high-altitude protective suit to resist axial separating movement of said parts, a frusto-conical locking ring overlying each of said outer surfaces and seating against the adjacent engaged part of the suit, the adjacent inner surfaces of said race members being unidirectionally inclined relative to said axis of rotation and overlapping one another and constituting bearing faces having opposed raceways therein, spherical anti-friction elements between said bearing faces seated in said raceways in closely spaced relation one to the other such that the spherical elements and raceways normally contact at a predetermined angle to the plane of said connector for withstanding unidirectional thrust and also axial separating movement of said adjacent parts of the suit, the outer race member having at its side face exposed to the inflating pressure an annular projection of reduced thickness extending axially outward therefrom, said projection having in its radially inner face an annular recess spaced from the pressure side face of said outer race member, an annular retaining element seated in said recess, and a sealing ring of flexible deformable material mounted on said projection axially inward of said retaining element and having a tapered portion of said material extending radially inward of said projection and axially inclined toward the pressure side face of the inner race member and having said tapered portion at its thin end pressing yieldably against the last said pressure side face to seal the space between said outer and inner race members.

14. An inflatable protective suit for incasing the wearer's body in an air-pressurized environment during high altitude flight, said protective suit comprising a torso-enclosing portion and an arm-enclosing portion, means rotatably connecting the arm-enclosing portion to the torso-enclosing portion, said arm-enclosing portion including an outer covering of flexible stress-resistant textile fabric material and an inner lining of flexible gas-impervious textile fabric material united therewith, the arm-enclosing portion including a gauntlet and a glove with closed end tubular fingers each formed of said material of said inner lining, a flexible restraining element of substantially inextensible filamentary material extending spirally along and about each said finger from end to end thereof and anchored continuously thereto, and hinge element of substantially inextensible filamentary material extending longitudinally along one side of each said finger and about its closed end and then longitudinally along the other side of the finger in continuously anchored relation thereto.

15. A flexible corrugated joint for connecting adjacent parts of a limb-enclosing portion of an inflatable protective suit for maintaining the wearer under air pressure equivalent to that at a safe relatively low altitude, while providing for relative swinging movement of said parts forwardly and rearwardly, said joint comprising a tubular member of highly flexible gas-impervious textile fabric material arranged in the form of substantially parallel circumferentially continuous corrugations in series axially of the member providing circumferentially continuous circular outer and inner ridges and grooves in said member with circumferentially continuous circular connecting portions of said material constituting the sides of said grooves, the annular wall of each continuous circular ridge being substantially flat in axial cross-section, means comprising circumferentially stretch-resisting textile material extending circumferentially about and overlying each of said continuous outer and inner ridges and secured to said member for maintaining the axial flatness of said ridges and for resisting radial distortion of the ridges in the inflated condition of the suit, and stretch-resisting flexible hinge elements extending axially along diametrically opposite sides of said tubular member and across all said ridges and grooves in overlying relation thereto and secured to end portions of said member for resisting axial separating movement of said ridges and said end portions at said hinge elements.

16. An inflatable protective suit of the character described comprising a body-enclosing outer covering including flexible stress-resistant textile fabric material capable of slight circumferential stretch, and a body-enclosing inner lining including flexible textile fabric material which is highly stretchable circumferentially and an elastomeric gas-impervious layer thereon, said outer covering and inner lining being subdivided to form torso, arm and leg-enclosing portions of the suit and united at least along margins thereof, said inner lining, in the inflated condition of the suit, being against and conforming to said outer covering, the torso-enclosing portion having a plurality of spaced flexible substantially inextensible restraining band members extending circumferentially about said torso-enclosing portion and being of the same circumferential extent as that of the outer covering of said portion and united with such outer covering thereof to locally restrain outward inflating distension and facilitate flexure and bending of the torso-enclosing portion.

17. An inflatable protective suit of the character described comprising a body-enclosing outer covering of single thickness flexible stress-resistant textile fabric composed of interlaced strands of filamentary material arranged such that said textile fabric is substantially inextensible laterally of the suit but slightly extensible longitudinally of the suit, a body-enclosing inner lining of single thickness flexible textile fabric composed of interlaced strands of filamentary material arranged such that the latter said textile fabric is highly stretchable laterally of the suit but substantially inextensible longitudinally of the suit, and a thin gas-impervious continuous layer of resilient rubber-like material between adjacent surfaces of the outer covering and inner lining and bonded throughout to one of said adjacent surfaces, the outer covering and inner lining and gas-impervious layer being subdivided to form torso, arm and leg-enclosing portions of the suit and united at least along margins thereof.

18. An inflatable protective suit for maintaining the wearer's entire body under an air pressure equivalent to that at a safe relatively low altitude, while facilitating free flexible movement of the wearer's limbs, said protective suit comprising a body-enclosing outer covering of flexible stress-resistant textile fabric material capable of slight longitudinal stretch, a body-enclosing inner lining including flexible textile fabric of slight longitudinal stretchability with a continuous gas-impervious layer of elastomeric material thereon united with said outer covering to form therewith torso, arm and leg-enclosing portions of the suit, said inner lining, in the inflated condition of the suit, being against and conforming to said outer covering, a head-enclosing portion joined in sealing relation to the torso-enclosing portion at the neck region, and means disposed longitudinally along each side of said torso-enclosing portion for adjusting the length of such portion relative to the wearer's torso, each said means comprising a flexible tension element of substantially inextensible material secured to the torso-enclosing portion in the region of the junction of an arm-enclosing portion with the torso-enclosing portion and extending along the side of the torso-enclosing portion, and a second flexible tension element of substantially inextensible material secured to the torso-enclosing portion in the region of the junction of a leg-enclosing portion with said torso-enclosing portion and extending along the side of the torso-enclosing portion, and means for adjustably and separably joining said tension elements one to the other so as to maintain a determinate length of said torso-enclosing portion to prevent lifting of said head-enclosing portion relative to the wearer's head in the inflated condition of the suit.

19. An annular rotatable connector for joining adjacent parts of an inflatable high-altitude protective suit, while providing for relative rotating movement of said parts but resisting relative axial separating movement thereof in the inflated condition of the suit, said rotatable connector comprising annular outer and inner race members in concentric radially spaced relation each having axially spaced side faces and radially spaced axially disposed outer and inner surfaces extending circumferentially about the race member between its said side faces, the said outer surfaces each having a shape adapted for conformance and contact with an adjacent part of the suit, the adjacent inner surfaces of said race members being unidirectionally inclined relative to the axis of rotation of the connector and constituting bearing faces having opposed raceways therein, spherical anti-friction elements between said bearing faces and seated in said raceways in closely spaced relation one to the other such that the spherical elements and raceways normally contact at a predetermined angle to the plane of said connector for withstanding unidirectional axial thrust, a sealing ring of flexible deformable material mounted on one of said race members at its side face for exposure to the inflating pressure in the suit and said ring having a thin portion of said material tapering to a thin edge and projecting radially and inclined axially toward the adjacent side face of the other race member with said thin edge yieldably and slidably contacting said adjacent side face in sealing relation thereto, and means carried by said one of said race members for retaining said sealing ring thereon in its mounted disposition.

References Cited in the file of this patent

UNITED STATES PATENTS

| | | |
|---|---|---|
| 2,365,779 | Schwab | Dec. 26, 1944 |
| 2,385,816 | Krupp | Oct. 2, 1945 |
| 2,393,171 | Krupp | Jan. 15, 1946 |
| 2,394,078 | Krupp | Feb. 5, 1946 |
| 2,410,632 | Colley et al. | Nov. 5, 1946 |
| 2,433,768 | Krupp | Dec. 30, 1947 |
| 2,705,692 | Petterson | Apr. 5, 1955 |

UNITED STATES PATENT OFFICE

CERTIFICATE OF CORRECTION

Patent No. 2,954,562 October 4, 1960

Carroll P. Krupp

It is hereby certified that error appears in the printed specification of the above numbered patent requiring correction and that the said Letters Patent should read as corrected below.

Column 1, line 37, for "stressed" read -- stresses --; column 8, line 13, for "rayor" read -- rayon --; column 14, line 75, for "the anchorage" read -- and anchorage --; column 17 line 63, strike out "of"; column 23, line 2, after "ridges" strike out the comma; same line, for "ridge" read -- ridges --.

Signed and sealed this 25th day of April 1961.

(SEAL)
Attest:

ERNEST W. SWIDER
Attesting Officer

DAVID L. LADD
Commissioner of Patents